US012583497B2

(12) United States Patent
Panosian et al.

(10) Patent No.: US 12,583,497 B2
(45) Date of Patent: \*Mar. 24, 2026

(54) SINGLE-OPERATOR MULTI-FUNCTION FOLDABLE TRANSPORTER

(71) Applicants: Michael H Panosian, Irvine, CA (US); Joshua M Keeler, Irvine, CA (US)

(72) Inventors: Michael H Panosian, Irvine, CA (US); Joshua M Keeler, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/404,952

(22) Filed: Jan. 5, 2024

(65) Prior Publication Data

US 2024/0227894 A1     Jul. 11, 2024

Related U.S. Application Data

(60) Provisional application No. 63/437,700, filed on Jan. 8, 2023.

(51) Int. Cl.
B62B 3/02        (2006.01)
B62B 3/04        (2006.01)
B62B 5/00        (2006.01)

(52) U.S. Cl.
CPC ............... B62B 3/022 (2013.01); B62B 3/04 (2013.01); B62B 5/0003 (2013.01); *B62B 2203/60* (2013.01); *B62B 2206/06* (2013.01)

(58) Field of Classification Search
CPC ......... B62B 3/022; B62B 3/04; B62B 5/0003; B62B 2203/60; B62B 2206/06;
(Continued)

(56) References Cited

U.S. PATENT DOCUMENTS 982,882 A * 1/1911 Schimmel ................. B62B 3/02
                                                    254/8 R
4,921,295 A * 5/1990 Stollenwerk ......... A61G 1/0212
                                                    296/20
(Continued)

FOREIGN PATENT DOCUMENTS

CN         115300240 A  * 11/2022
DE    202007016951 U1 *  5/2009  ........... A61G 1/0212
(Continued)

OTHER PUBLICATIONS

Translated CN-115300240-A (Year: 2024).*

*Primary Examiner* — James A Shriver, II
*Assistant Examiner* — Ian Bryce Shelton
(74) *Attorney, Agent, or Firm* — ARJOMAND LAW GROUP; Farjam Maid

(57)        ABSTRACT

A system is disclosed including a transporter, having a top load bearing surface or bed, and four wheeled articulating legs, that may be operated by a single user/operator, and can be lowered or raised by changing the lengths or angles of its legs while maintaining the transporter bed level. The legs that may be folded up to be loaded onto or unloaded from a truck bed, or a stationary platform, by a single operator while carrying heavy load. The loading and unloading process is assisted by various safety brakes that prevent accidental slippage of the transporter off the truck bed. The legs' angles are changed using a dual-threaded lead screw. The transporter further includes two edge detectors on the front-end and the rear-end to detect the edge of the truck bed automatically, and prepare the folding of the transporter legs for loading onto the truck bed.

20 Claims, 29 Drawing Sheets

(58) Field of Classification Search
CPC ......... B62B 2203/10; B62B 1/12; B62B 1/20;
A61G 1/0262; A61G 2203/30; A61G
1/00; A61G 3/00; B60Y 2200/48
See application file for complete search history.

(56) References Cited

U.S. PATENT DOCUMENTS

| | | | | | |
|---|---|---|---|---|---|
| 5,015,024 | A | * | 5/1991 | Bloemer | A61G 1/0237 |
| | | | | | 280/767 |
| 5,697,471 | A | * | 12/1997 | DiMucci | A61G 7/012 |
| | | | | | 182/141 |
| 5,740,884 | A | * | 4/1998 | DiMucci | A61G 1/02 |
| | | | | | 182/141 |
| 6,735,794 | B1 | * | 5/2004 | Way | B60B 33/021 |
| | | | | | 16/35 R |
| 7,631,373 | B2 | * | 12/2009 | Broadley | A61G 1/0212 |
| | | | | | 5/625 |
| 7,658,388 | B1 | * | 2/2010 | Rodriguez | B62B 5/0003 |
| | | | | | 280/30 |
| 9,114,047 | B2 | * | 8/2015 | Magill | A61G 1/02 |
| 10,640,135 | B1 | * | 5/2020 | Geffen | B62B 3/02 |
| 10,780,907 | B1 | * | 9/2020 | Camarco | B66F 7/0625 |
| 11,427,263 | B1 | * | 8/2022 | Dusold | B62B 3/02 |
| 11,840,269 | B2 | * | 12/2023 | Brunner | B62B 1/002 |

| | | | | |
|---|---|---|---|---|
| 2006/0016008 | A1* | 1/2006 | Choi | A61G 1/0212 |
| | | | | 5/610 |
| 2013/0168987 | A1* | 7/2013 | Valentino | A61G 1/056 |
| | | | | 92/61 |
| 2014/0197654 | A1* | 7/2014 | Valentino | A61G 1/013 |
| | | | | 296/20 |
| 2014/0374680 | A1* | 12/2014 | Tsang | B62B 3/0612 |
| | | | | 254/7 C |
| 2018/0009461 | A1* | 1/2018 | Rucker | B62B 3/022 |
| 2019/0092364 | A1* | 3/2019 | Pettinato | A01N 1/0273 |
| 2019/0111954 | A1* | 4/2019 | Grotton | B25H 1/04 |
| 2021/0101288 | A1* | 4/2021 | Lee | A61G 7/05 |
| 2021/0300447 | A1* | 9/2021 | Brunner | B62B 1/002 |
| 2021/0353476 | A1* | 11/2021 | Lafleche | A61F 5/37 |
| 2022/0379940 | A1* | 12/2022 | Watson | B62B 3/005 |

FOREIGN PATENT DOCUMENTS

| | | | | | | |
|---|---|---|---|---|---|---|
| EP | | 3791844 | A1 | * | 3/2021 | ........... A61G 1/0562 |
| FR | | 2664495 | A1 | * | 1/1992 | |
| GB | | 2298619 | A | * | 9/1996 | ........... A61G 1/0212 |
| JP | | S6226159 | A | * | 2/1987 | |
| JP | | S62117557 | A | * | 5/1987 | |
| WO | WO-2006032260 | A1 | * | 3/2006 | ........... A61G 1/0212 |
| WO | WO-2004028432 | A2 | * | 4/2007 | ........... A61G 1/0212 |
| WO | WO-2015074630 | A1 | * | 5/2015 | ........... A61G 1/0212 |
| WO | WO-2020003302 | A1 | * | 1/2020 | ............. B62B 1/002 |

* cited by examiner

740

104

102

131

103

731

SINGLE-OPERATOR MULTI-FUNCTION FOLDABLE TRANSPORTER

CROSS-REFERENCE(S) TO RELATED APPLICATION(S)

The present application claims the benefit of the filing date of the U.S. Provisional Patent Application 63/437,700, entitled "MULTI-FUNCTIONAL FOLDABLE TRANSPORTER," filed on 8 Jan. 2023, the contents of which are hereby expressly incorporated by reference in its entirety, under 35 U.S.C. § 119(e).

TECHNICAL FIELD

This application relates generally to carts and transporters. More specifically, this application relates to a single-operator multi-function foldable transporter useable to carry storage boxes and tools.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1A:
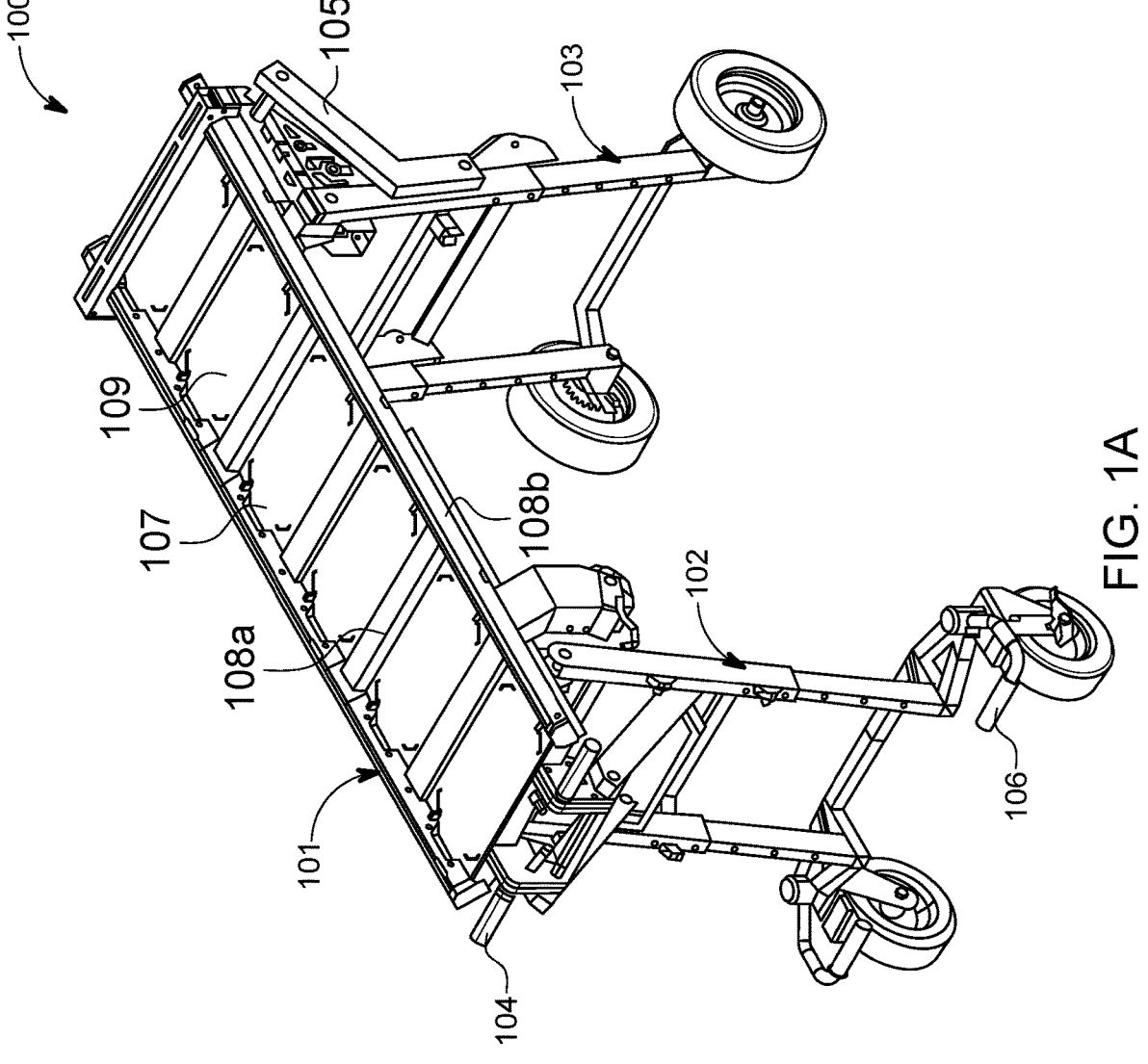
FIG. 1A shows an example rear top view of a foldable transporter.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references particular transporter configurations used for construction sites, it will be appreciated that the disclosure may be used with other types of transportation applications, such as transportation of equipment for hospitals, kitchens, and the like.

Briefly described, a system is disclosed including a transporter, having a top load bearing surface or bed, and four wheeled articulating legs, that may be operated by a single user/operator, and can be lowered or raised by changing the lengths or angles of its legs while maintaining the transporter bed level with respect to ground. The legs that may be folded up to be loaded onto or unloaded from a truck bed, or a stationary raised platform such as a warehouse, by a single operator while carrying heavy load. The loading and unloading process is assisted by various safety brakes that prevent accidental and unwanted slippage of the transporter off the truck bed. The legs' angles with respect to the top load bearing surface may be changed using a dual-threaded lead screw, each end working in an opposite direction with respect to the other end to pull in or push out the legs simultaneously and in tight unison. The transporter further includes an edge detector on the front end and one on the rear-end to detect the edge of the truck bed automatically and prepare the folding and unfolding of the transporter legs for loading and unloading onto/from the truck bed. The transporter further includes a front-end ramp to allow pushing the transporter onto the truck bed. In some embodiments, the transporter may be motorized to provide traction on the front-end ramp as well as motorized turning of the dual-threaded lead screw for raising and lowering the transporter's top load bearing surface. The dual-threaded lead screw has a hand-crank and/or drill interface to allow turning the dual-threaded lead screw. The transporter bed includes latch receivers to receive latch cleats from storage boxes to lock them down for transportation.

In various embodiments, a single-operator transporter is disclosed that includes a transporter bed to carry cargo, lockable front legs to carry a front-end weight of the cargo, lockable rear legs to carry a rear-end weight of the cargo, and an automatic edge detector to automatically unlock the lockable front legs to allow the transporter to be loaded onto a raised platform by a single operator.

In various embodiments, a load-sustaining transporter is disclosed having an articulating front leg to sustain a weight of the load-sustaining transporter before and during loading the load-sustaining transporter onto a raised platform. It also includes a loading ramp coupled with the articulating front leg to take on the load from the articulating front leg during loading the load-sustaining transporter.

In various embodiments, transporter a load-bearing transporter bed having at least one concave compartment; wherein the concave compartment incudes a plurality of latch receivers; and wherein the plurality of latch receivers is configured to receive corresponding latches integrated with convex bottom storage boxes to be placed on the load-bearing transporter bed.

In various industrial applications, including construction projects, repair shops, plumbing service providers, auto repair facilities, and the like, a multitude of various hand and power tools are employed. The number and weight of all the tools that may have to be carried to a job site and back or keep organized in a repair shop may become unmanageable without effective storage and transportation, causing loss of tools, missing the tools needed for a job, and making it difficult to carry all the tools needed for a project. Often, tools and equipment are carried from a shop or other place of business to a job site for usage/application. Such tools and equipment are often carried a relatively short distance and loaded onto a truck, carried by the truck to the job site over a relatively longer distance, and then carried from the truck to the point of application over a relatively shorter distance. The reverse of this transportation from job site to the shop happens after the work is done. There is a need for an effective, quick, and easy way to transport all needed storage containers and tools between the shop and the point of application, and back, even when there is a single operator/ user (that is, without an assistant or helper) of these tools.

It is to be noted that directions, orientations, and other relative terms such as "front", "back", "top", "bottom", "left", "right", "inside", "outside", "interior", "exterior", "downward", "upward", "front-facing", "down-facing", "vertical", "horizontal", "diagonal", and the like are described with respect or relative to a distinguishing feature of the system or device body itself. For example, if the front part or surface of a system body or an object is identified in the description, then rear or back is defined as the part or surface opposite the front surface, left is defined as the left side when looking into the front surface, and so on. As long as directions are unambiguously identifiable based on the descriptions and figures, how the orientations are defined is immaterial.

It is further to be noted that values of various quantities and parameters, and/or differences between systems or mechanisms or processes, may be expressed as estimated values with reference to another similar quantity or system, using terms such as "substantially," "approximately," "almost," "materially," "nearly," "about," and the like. In many fields, such as engineering, chemistry, finance and others, differences between two similar entities or quantities that are equal to or less than five percent (5%) are considered as insignificant, forming a reasonable approximation of the quantity. In the context of systems, insignificant difference is defined as difference between the outputs of the systems being less than or equal to 5%.

I. Single-Operator Transporter

FIG. 1A shows an example rear top view of a foldable transporter. In various embodiments, the rear top view 100 includes transporter 101, rear legs 102, front legs 103, transporter handles 104, front legs struts 105, rear leg handles 106, storage box latch receivers 107, cross beams 108*a*, side beams 108*b*, and surface panels 109.

In various embodiments, the orientation of the transporter 101 and its various parts and components as referred to in this disclosure is defined with reference to particular parts of the transporter itself. Specifically, the wheels on the legs define the bottom direction, the cross beams 108*a* define the top direction, the rear legs 102 define the rear or back direction, and the front legs 103 define the front or forward direction.

In various embodiments, the transporter 101 may be raised or lowered via change of length and/or angle of rear legs 102 and front legs 103, as further described in detail with respect to other figures. The transporter handles 104 may be used by an operator to push and pull the transporter 101 and perform other functions as further described in more detail with respect to other figures.

In various embodiments, the side beams 108*b* and cross beams 108*a* form a top load-bearing surface (transporter bed) of the transporter 101. Surface panels 109 may also be part of the transporter bed. In various embodiments, the surface panels 109, along with one or more of the cross beams 108*a* and the side beams 108*b* may form an open-top compartment with beveled or slanted interior sides. The boundaries of one of the open-top compartments are defined on the sides by the cross beams 108*a* and side beams 108*b*, surrounding the open-top compartment, and on the bottom by the surface panels 109. Various boxes and containers may be placed and locked in such open-top compartments, as further described below with respect to other figures.

In various embodiments, the storage box latch receivers 107 may be useable to lock stackable storage boxes to the top surface of the transporter 101. This arrangement keeps the stackable storage boxes securely attached to the transporter 101 during movement and loading/unloading onto/ from a truck. It is to be noted that even though the present disclosure describes the loading/unloading of the transporter 101 onto/from a truck bed, the transporter 101 may be loaded/unloaded onto/from any stationary raised platform, such as a warehouse shipping dock or a shop equipment deployment port.

Figure 1B:
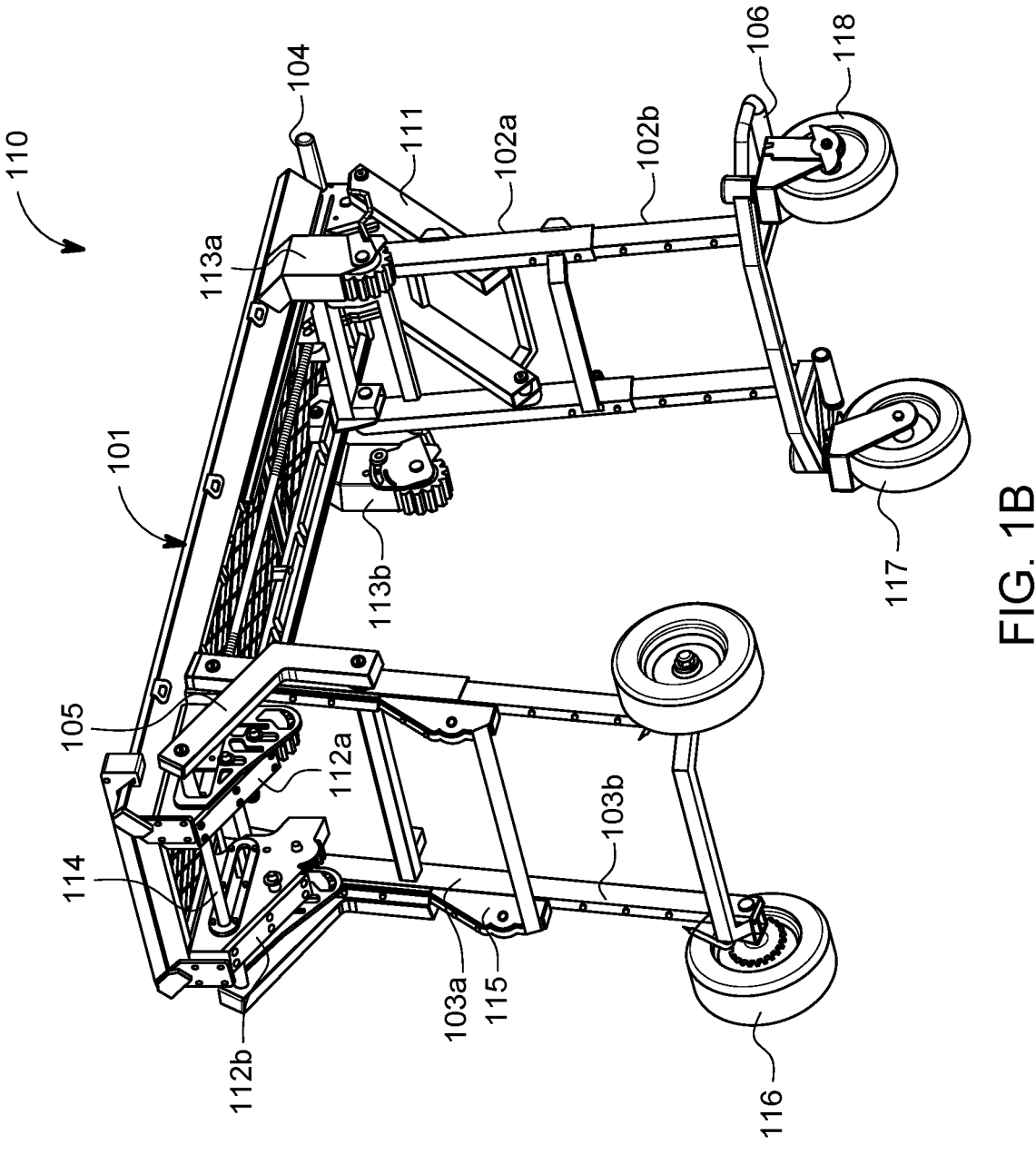
FIG. 1B shows an example front bottom view of the foldable transporter of FIG. 1A.

FIG. 1B shows an example front bottom view of the foldable transporter of FIG. 1A. In various embodiments, the front bottom view 110 includes transporter 101, rear legs upper sections 102*a*, rear legs lower sections 102*b*, front legs upper sections 103*a*, front legs lower sections 103*b*, transporter handles 104, front leg strut 105, rear leg handles 106, rear leg struts 111, transporter loading ramps 112*a* and 112*b*, truck bed wheels 113*a* and 113*b*, front leg struts cross bar 114, front legs loading ramps 115, front leg wheels 116, rear wheels 117, and rear leg wheel lock 118.

In various embodiments, the front legs 103 and the rear legs 102 of the transporter 101 may include multiple sections telescopically related to each other. For example, the rear legs lower sections 102*b* fit inside rear legs upper sections 102*a* to form a telescopic configuration that together may be used to adjust the overall length of the rear legs 102. Specifically, the rear legs lower sections 102*b* slide up the rear legs upper sections 102*a* to make the rear legs 102 shorter. Similarly, the front legs lower sections 103*b* and the front legs upper sections 103*a* function the same way.

In various embodiments, the rear legs handles 106 may be used by an operator to fold up the rear legs 102, as further described below with respect to other figures herein.

In various embodiments, the rear legs struts 111 function as a structural truss member forming a triangle between the rear legs 102 and transporter top load bearing surface including side beams 108*a* and 108*b* that create a rigid overall structure on the rear section of the transporter 101. The rear legs struts 111 may be detached from the transporter top load bearing surface to release the rear legs 102 to be lifted by rear legs handles 106 and folded up for loading into the truck bed. This is described in further details with respect to other figures below.

In various embodiments, a load transfer coupling may be used to couple or temporarily attach the front end of the transporter 101 to a platform to transfer the load/weight of the transporter 101 and its cargo to the platform, such as a truck or other platform. In some embodiments, the load transfer coupling may be implemented in the for of loading ramps 112*a* and 112*b* are slanted sides used for climbing up onto a truck bed for loading the transporter 101 onto the truck. In some embodiments, loading ramps 112*a* and 112*b* are made of a hard and smooth surface, such as hard plastic or aluminum to slide up the truck bed with low friction. In other embodiments, described in more detail later, loading ramps 112*a* and 112*b* may be equipped with rubber tracks (similar to a bulldozer) and motorized to assist the operator in loading the transporter 101 onto the truck bed. In other embodiments, the loading ramps 112*a* and 112*b* may be replaced with wheels, rollers, multi-wheels (multiple wheels arranged around one common axel used to climb stairs), or other configurations suitable for resting on a ledge or platform (example, a truck bed or tail gate) to transfer load from the transporter 101 to the platform.

In various embodiments, truck bed wheels 113*a* and 113*b* are used to support the weight of the transporter 101 and the load it may be carrying when the transporter 101 is in a folded state, with both rear legs 102 and front legs 103 are folded up and no longer are in contact with the floor of the truck bed.

In various embodiments, front legs struts cross bar 114 may be coupled with the front legs struts 105, and is used to lock front legs 103 in a standing state, rigidly holding front legs 103 in this position with respect to the transporter 101. As further described below, front legs struts cross bar 114 may be used as a safety brake during loading and unloading the transporter 101 onto a truck. This cross bar may also be released from its locked position to allow the front legs 103 to fold under the transporter 101 top load bearing surface during loading transporter 101 onto the truck bed. Its usage and operation is described in further detail below with respect to other figures.

In various embodiments, front leg ramps 115 are used to smoothly slide the front legs 103 on the edge of the truck bed during the loading of the transporter 101 onto the truck bed.

In various embodiments, some or all front wheels 116 and rear wheels 117 may have a wheel brake or lock 118 on them to prevent transporter 101 from rolling freely.

Figure 1C:
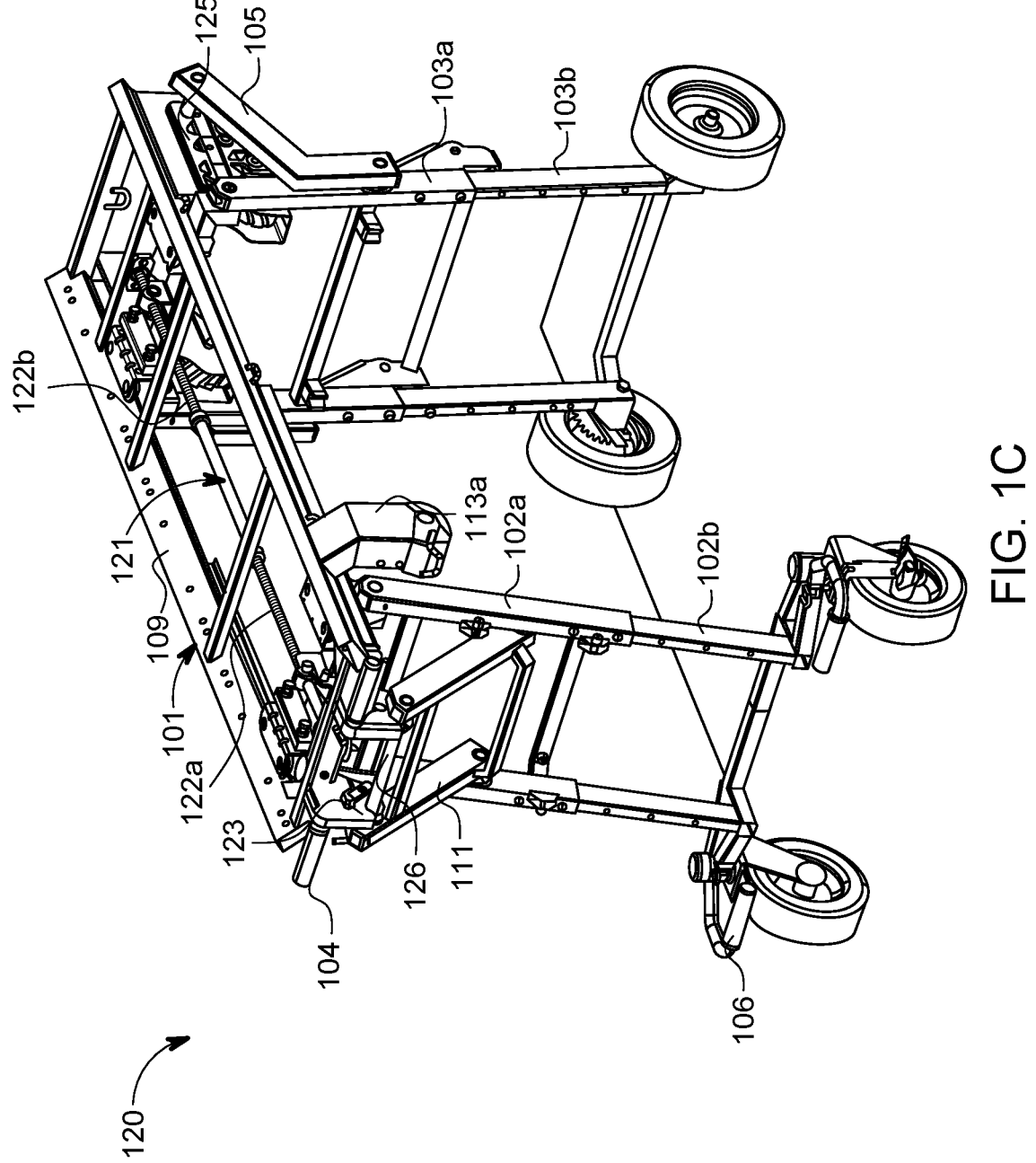
FIG. 1C shows an example detailed rear top view of the foldable transporter of FIG. 1A.

FIG. 1C shows an example detailed rear top view of the foldable transporter of FIG. 1A. In various embodiments, rear top view 120 includes transporter 101, rear legs upper parts 102*a*, rear legs lower sections 102*b*, front legs upper parts 103*a*, front legs lower sections 103*b*, transporter handles 104, front leg strut 105, rear leg handles 106, rear leg struts 111, truck bed wheel 113*a*, dual-threaded lead screw 121, rear lead screw 122*a*, front lead screw 122*b*, rear struts hook 123, front struts ratchet teeth 125, and rear struts cross bar 126.

In various embodiments, the rear struts 111 include a rear struts cross bar 126 that is coupled with the transporter bed via the rear struts hook 123. The rear legs 102 may be folded for loading the transporter 101 onto the truck bed if the rear struts cross bar 126 is released from the rear struts hook 123.

In various embodiments, the dual-threaded lead screw 121 has two end sections with the function of pulling the rear legs 102 and front legs 103 towards each other or pushing them away. The first end section is the rear lead screw 122*a*, and the second end section is the front lead screw 122*b* have opposite and symmetrical screw pitches. That is, one of the rear and front lead screws is a left-handed thread and the other one is a right-handed thread. This way, when the dual-threaded lead screw 121 turns clockwise ("CW"), depending on the pitch direction, one end section of the dual-threaded lead screw 121 advances an attached nut in one direction, while simultaneously, the other end section advances another attached nut in the opposite direction.

In various embodiments, the rear legs lower section 102*b* is slid further up the rear legs upper section 102*a* and secured at a desired position. This way the legs may be made longer or shorter. The lower and upper leg sections are fastened together via various known methods such as by friction, pressure fit, or more positive peg-and-hole configurations in which a spring loaded peg or ball in one leg section enters a matching hole in the mating section to keep the two sections fastened together. In other embodiments, the leg sections may be bolted together using wingnuts that allow easy adjustment by a user without tools.

Figure 1D:
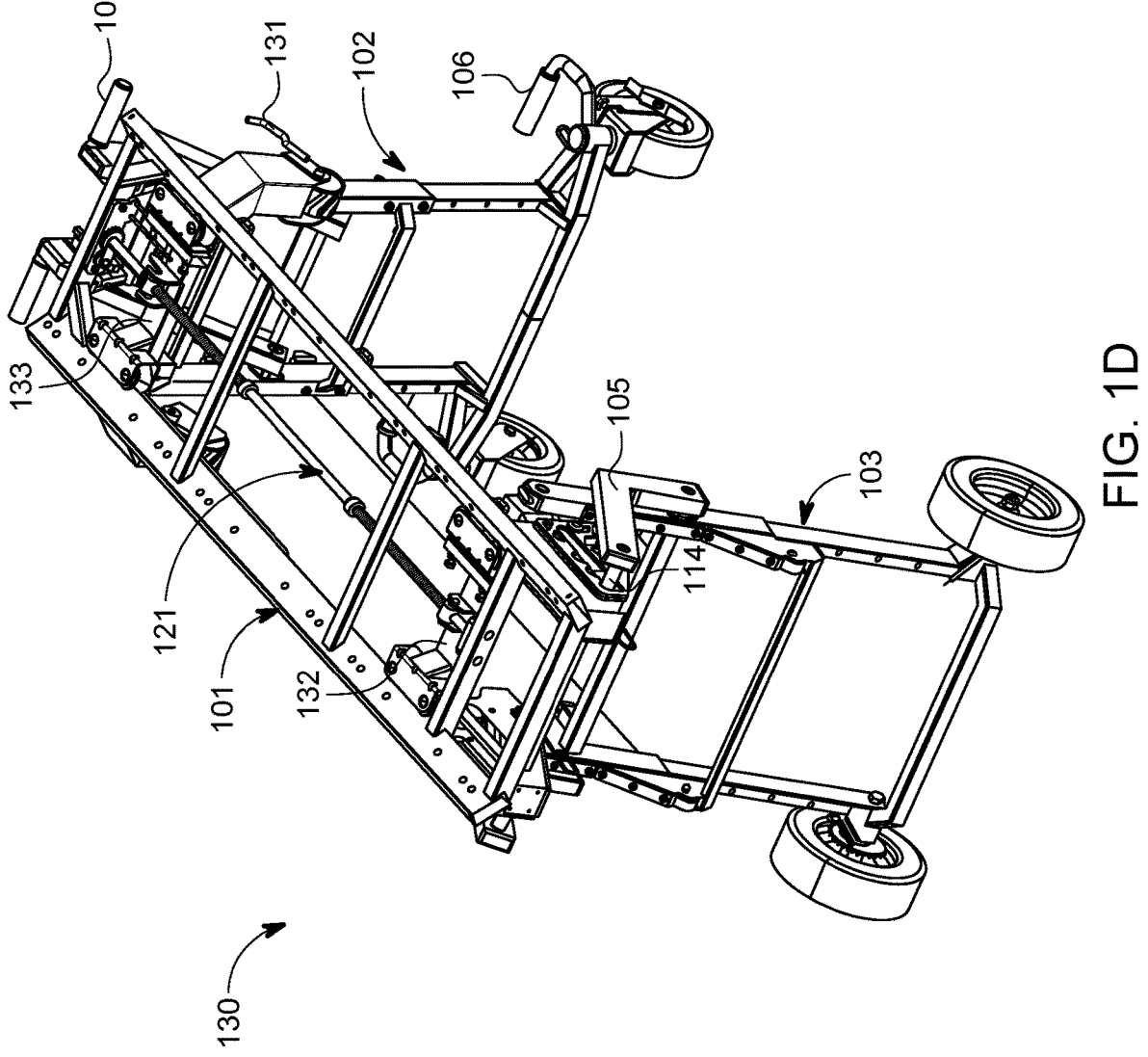
FIG. 1D shows an example front top view of the foldable transporter of FIG. 1A with a top surface removed.

FIG. 1D shows an example front top view of the foldable transporter of FIG. 1A with a top surface removed. In various embodiments, the front top view 130 of the transporter includes rear edge detectors 131, front leg carriage 132 and rear leg carriage 133.

In various embodiments, the rear edge detectors 131 are coupled with truck bed wheels 113*a* and 113*b*. The rear edge detectors 131 are spring loaded and biased to move downwards to a locked-state. In the locked-state, the rear edge detectors 131 are engaged with truck bed wheels 113*a* and 113*b* and locks them to prevent these wheels from rotating freely. An unlocked-state is entered, when the rear legs 102 are fully folded up and the rear edge detectors 131 are resting at the same level and/or on the same surface as the truck bed wheels 113*a* and 113*b*. Otherwise, the rear edge detectors 131 are in a locked-state and lock the truck bed wheels 113*a* and 113*b*, preventing them from rolling. Hence, the rear edge detectors 131 detect an edge when they fall off the edge and enter the locked-state and lock the truck bed wheels 113*a* and 113*b*.

In various embodiments, the front leg carriage 132 and the rear leg carriage 133 are couped with the front legs 103 and rear legs 102, respectively. When the dual-threaded lead screw 121 is turned CW or CCW, depending on the thread direction (left-handed or right-handed thread), the leg carriages are pulled in towards the center of the dual-threaded lead screw 121 or pushed away from the center. If the carriages are pulled towards the center, then the rear legs 102 and front legs 103 are pushed away from each other and spread wider, while lowering the transporter bed. Alternatively, if the carriages are pushed away from the center, then the rear legs 102 and front legs 103 are pulled towards each other and spread narrower, while raising the transporter bed. In each case, the transporter bed is raised or lowered while staying level if the transporter is also resting on a level surface. Turning the lead screw 121 causes the rear legs 102 and front legs 103 to rotate about their respective pivot points, attached to the transporter bed, in opposite directions. If the front legs rotate CW, then the rear legs will rotate CCW, and vice versa.

Figure 1E:
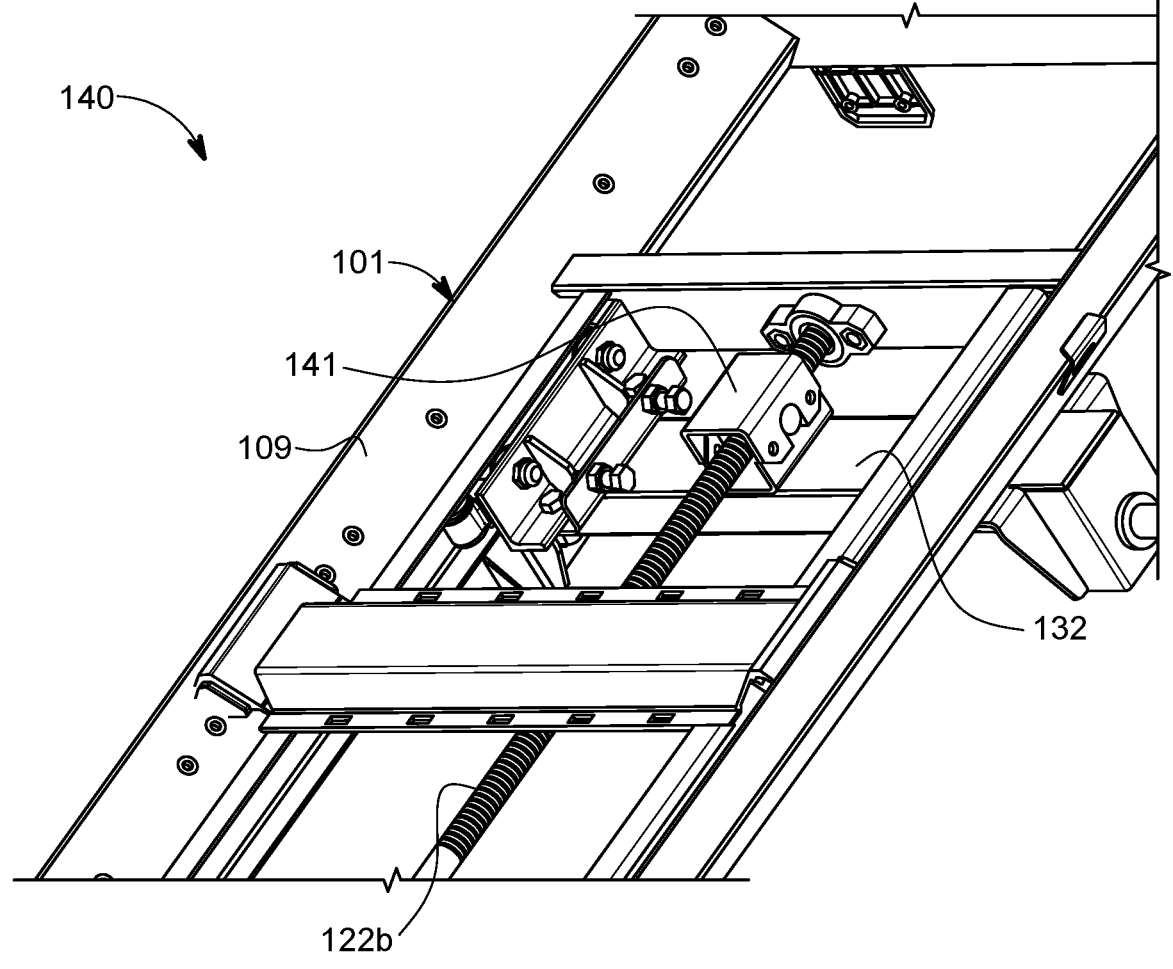
FIG. 1E shows an example detailed view of a coupling of lead screw and front legs of the foldable transporter of FIG. 1A.

FIG. 1E shows an example detailed view of a coupling of lead screw and front legs of the foldable transporter of FIG. 1A. In various embodiments, the detailed view 140 includes a front carriage nut 141.

In various embodiments, the front carriage nut 141 couples the front lead screw 122*b* with the front legs 103 via the front leg carriage 132. When the dual-threaded lead screw 121 turns, either CW or CCW, the front carriage nut 141 pushes or pulls the front leg carriage 132 in one direction, causing the front wheels 116 to move in the opposite direction.

In various embodiments, spreading the transporter legs or closing them, result in lowering or raising the transporter bed, respectively. This process allows the transporter bed height to be adjusted to a comfortable level for working with tools such as saws, or to use the transporter bed as a work bench at a suitable height.

Figure 2A:
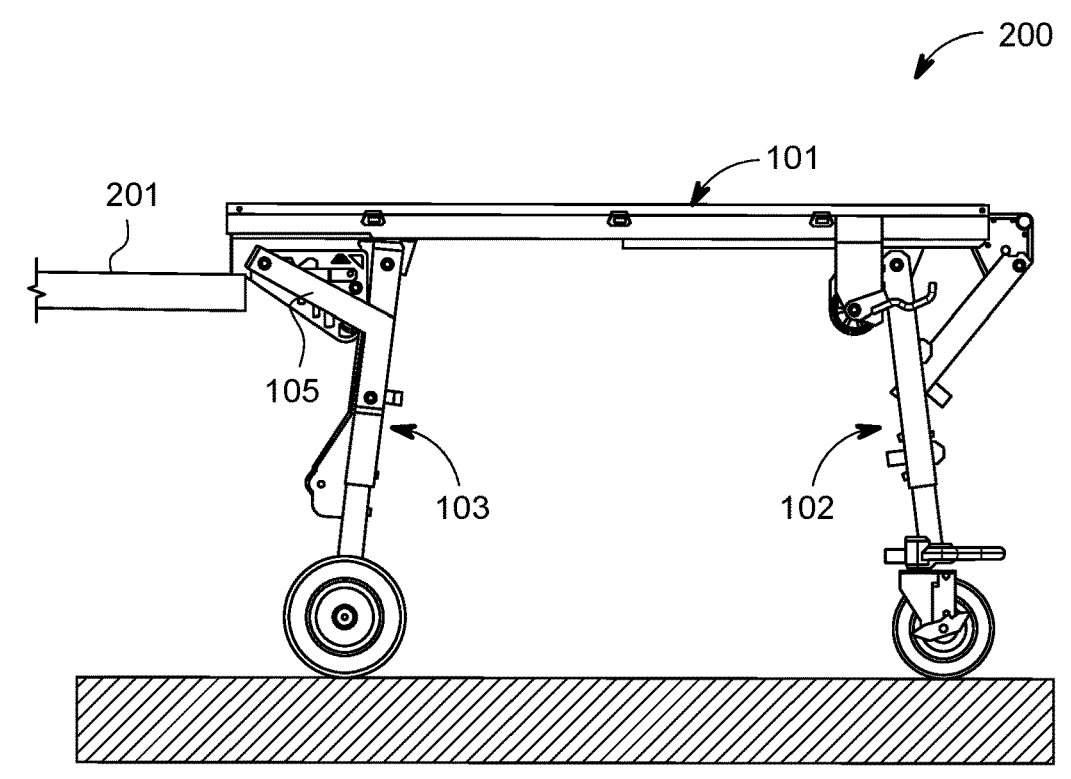
FIG. 2A shows an example side view of the foldable transporter of FIG. 1A engaging a low truck platform.

FIG. 2A shows an example side view of the foldable transporter of FIG. 1A engaging a low truck platform. In various embodiments, the side view 200 includes a lower truck bed 201 at a relatively lower height.

In various embodiments, the front legs 103 and rear legs 102 of the transporter 101 may be shortened or lengthened by the user, in a telescopic fashion as described above, to match the height of the truck bed 201, for a particular truck that may be in use for a project. The height of the transporter 101 is adjusted so that the loading ramps 112*a* and 112*b* slightly exceed the height of the truck bed 201 from the ground. This way, the loading ramps 112*a* and 112*b* may be pushed by the operator onto the truck bed 201.

Figure 2B:
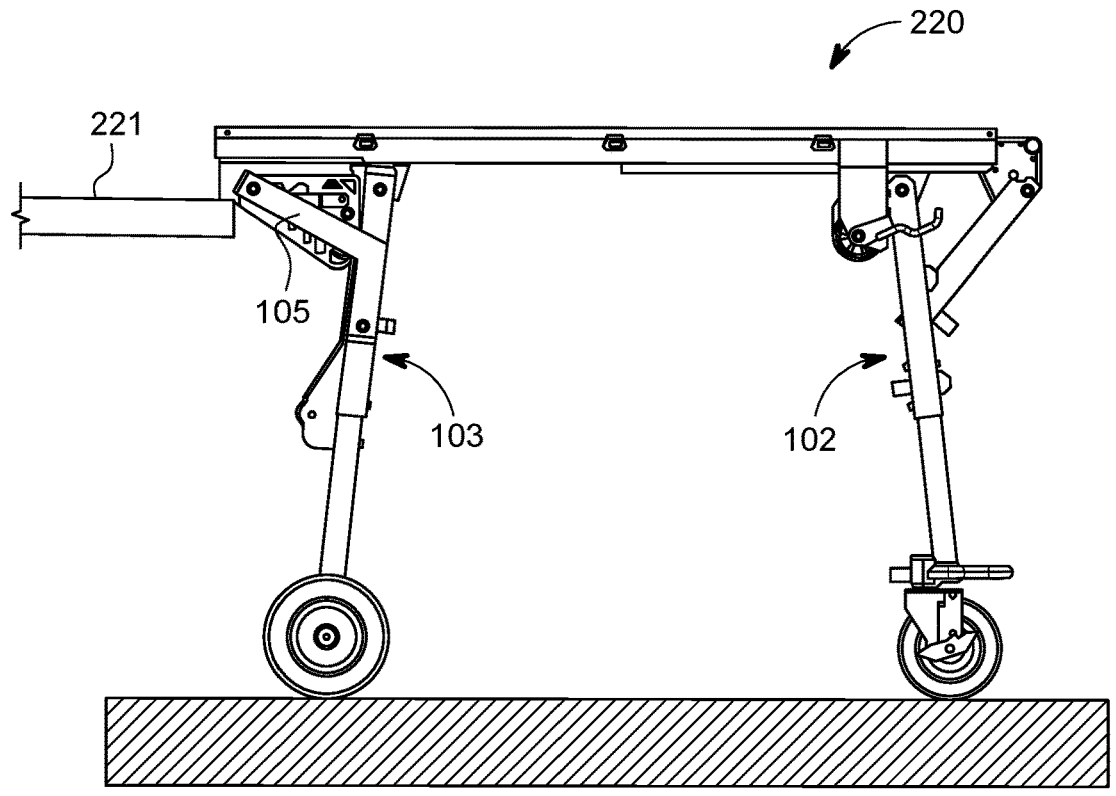
FIG. 2B shows an example side view of the foldable transporter of FIG. 1A engaging a high truck platform.

FIG. 2B shows an example side view of the foldable transporter of FIG. 1A engaging a high truck platform. In various embodiments, the side view 220 includes a higher truck bed 221 at a relatively lower height.

In various embodiments, the front legs 103 and rear legs 102 of the transporter 101 may be shortened or lengthened by the user, in a telescopic fashion as described above, to match the height of the truck bed 221, for a particular truck that may be in use for a project. The height of the transporter 101 is adjusted so that the loading ramps 112*a* and 112*b* slightly exceed the height of the truck bed 221 from the ground. This way, the loading ramps 112*a* and 112*b* may be pushed by the operator onto the truck bed 221.

Figure 2C:
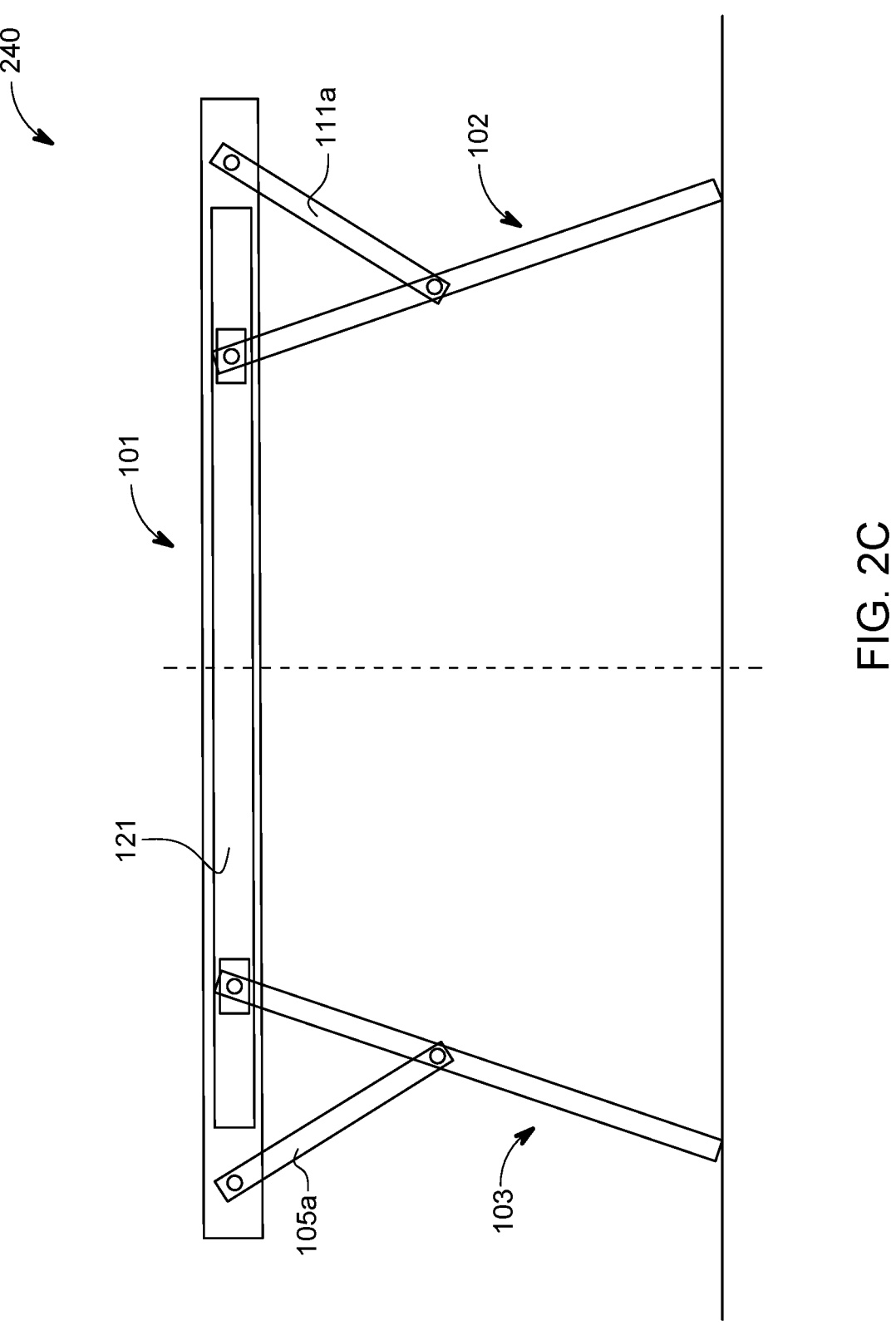
FIG. 2C shows an example kinematic view of the foldable transporter.

FIG. 2C shows an example kinematic view of the foldable transporter. In various embodiments, the kinematic view 240 includes pivot point A joining front leg struts 105*a* and transporter bed, pivot point F joining rear leg struts 111*a* and transporter bed, pivot point B joins front leg upper section 103*a* with dual-threaded lead screw 121 via front leg carriage 132 and front carriage nut 141, pivot point E joins rear leg upper section 102*a* with dual-threaded lead screw 121 via rear leg carriage, pivot point C joining front leg 103 with front leg struts 105*a*, pivot point G joining rear legs 102 with rear leg struts 111*a*, and center line CF marking the center of the dual-threaded lead screw 121, being the same as the center of the transporter 101.

In various embodiments, the kinematic view 240 signifies the kinematic relationship between the structural members of the transporter 101 including the transporter bed, the front and rear legs, and front and rear struts. When the struts are locked at pivot points A and F, the triangles ABC and EFG form a truss that is rigid and not movable. Once, the struts are detached from pivot points A and F, however, the front and rear legs may be folded to a zero angle with respect to the transporter bed to make the transporter more flat without the legs standing out at any non-zero angle with respect to the transporter bed. The transporter structural members are shown in symmetrical form in this view to clearly depict the symmetry of the structure of the transporter 101. This symmetry also allows the transporter bed to be raised and lowered parallel to the ground the transporter is standing on.

In various embodiments, the kinematics of the transporter described above result in a particular behavior of the rear and front legs. Specifically, turning the lead screw 121 causes the rear legs 102 and front legs 103 to rotate about their respective pivot points E and B, respectively, in opposite directions. If the front legs rotate CW, then the rear legs will rotate CCW, and vice versa.

Figure 3A:
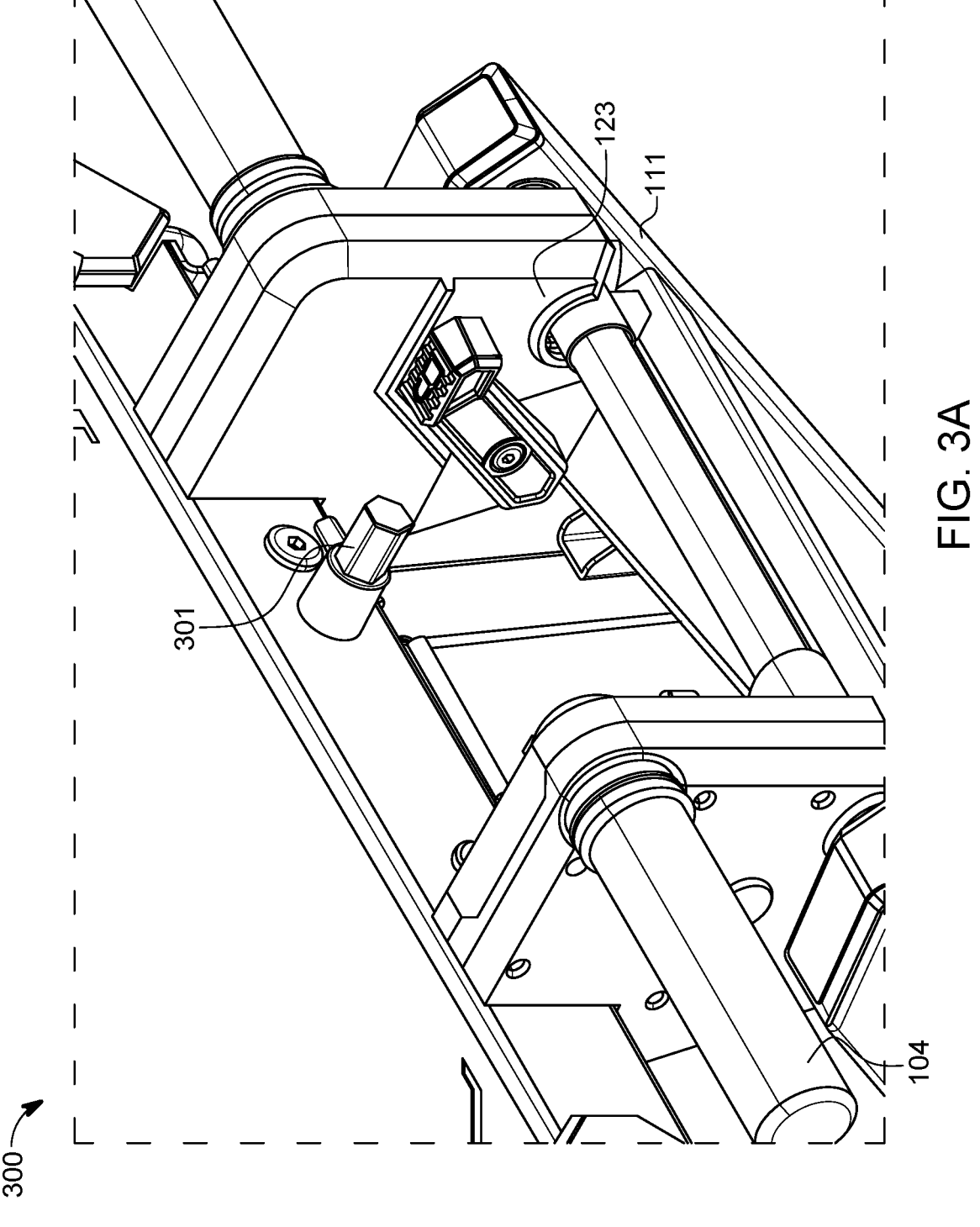
FIG. 3A shows an example drill interface for turning lead screws.

FIG. 3A shows an example drill interface for turning lead screws. In various embodiments, the drill interface 300 includes a rotation port 301 attached to the dual-threaded lead screw 121.

In various embodiments, the rotation port 301 may be a protrusion that may be coupled with a socket wrench that may be used to rotate the protrusion, and in turn, the dual-threaded lead screw 121 in CW or CCW directions. The protrusion may be a hexagonal rod, a flat rod, or a rod of any other non-circular cross-sectional shape that can prevent slippage of the socket wrench with respect to the rotation port 301 during high-torque rotation operations. In some embodiments, the rotation port 301 may be a recess of non-circular shape and screwdriver or other type of wrench with a mating shape to turn the dual-threaded lead screw 121.

In various embodiments, the rotation port 301 may be turned by a hand crank with a mating shape relative to the rotational port 301, an electric drill, or a motor. The hand crank may have step-shaped crank suitable for turning the dual-threaded lead screw 121 by hand. The electric drill may be any common drill with an attached bit that has a mating shape relative to the rotational port 301. A motor may also be coupled with the rotational port 301 in other embodiments, as further described with respect to other figures below.

II. Motorized Transporter

Figure 3B:
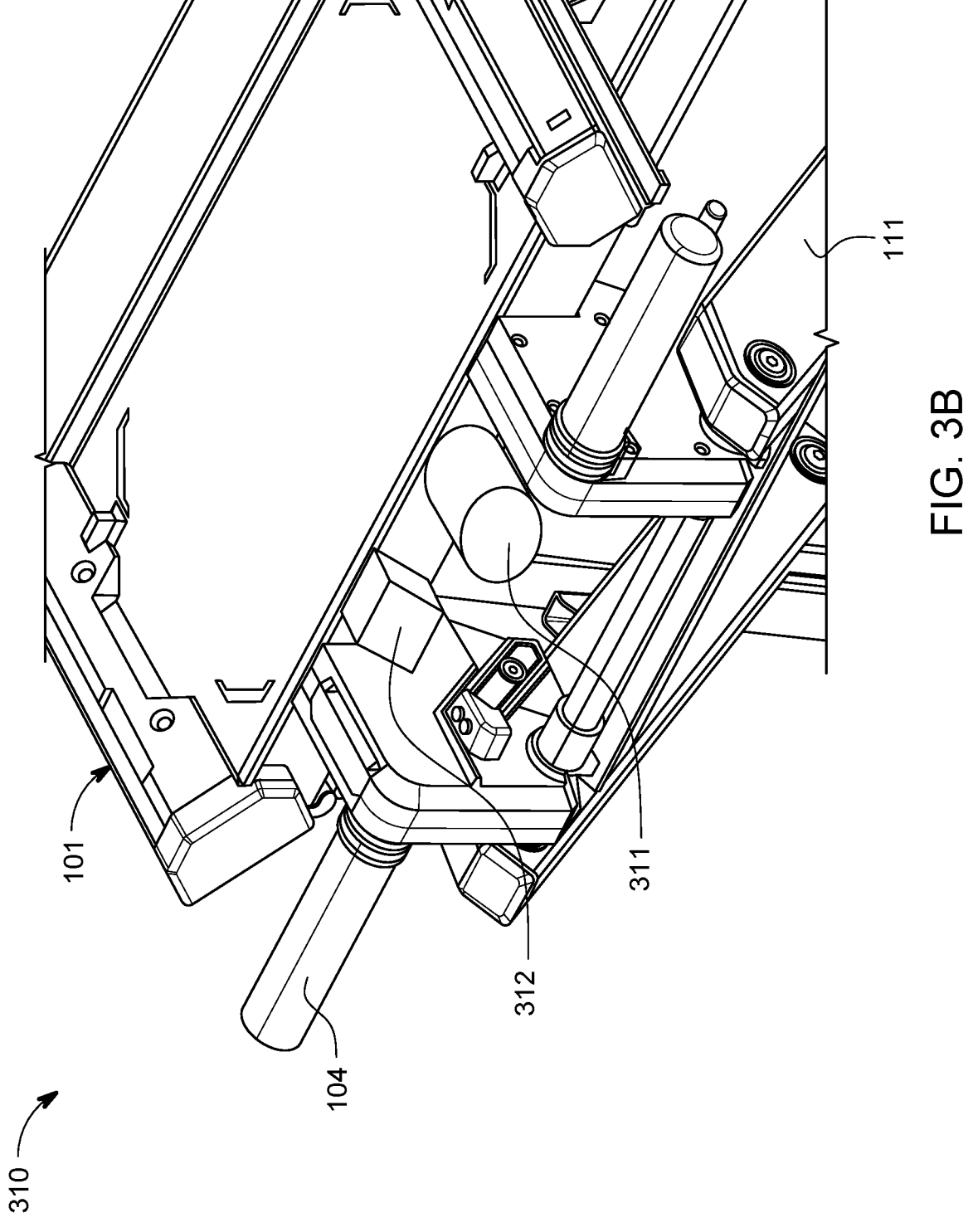
FIG. 3B shows an example motorized configuration for turning lead screws.

FIG. 3B shows an example motorized configuration for turning lead screws. In various embodiments, the motorized configuration 310 includes an electric motor 311 and a battery pack 312.

In various embodiments, the motorized configuration may perform two functions including a motorized loading ramp and a motorized dual-threaded lead screw to raise or lower the transporter bed. In some embodiments, the motorized configuration may only perform one of these functions, while in other embodiments, both functions may be performed. In some embodiments, all motorized functions may be performed by a single electric motor, while in other embodiments, each function may be performed by a separate electric motor. In some embodiments, more than one electric motor may be employed to perform the same function.

In various embodiments, the electric motor 311 may be directly coupled with the rotation port 301, while in other embodiments, it may be coupled indirectly via various linkages, belts, shafts, pullies, transmission box, or other techniques for coupling a motor to a device.

In some embodiments, the electric motor 311 is coupled to and powered by the battery pack 312. In other embodiments, the electric motor 311 may be optionally powered by the batter pack 312 and alternatively from an AC (Alternating Current) power source.

In various embodiments, the electric motor 311 may be controlled via control interface built into the transporter handles 104. In other embodiments, the motor control interface may be separately deployed on the transporter 101.

Figure 3C:
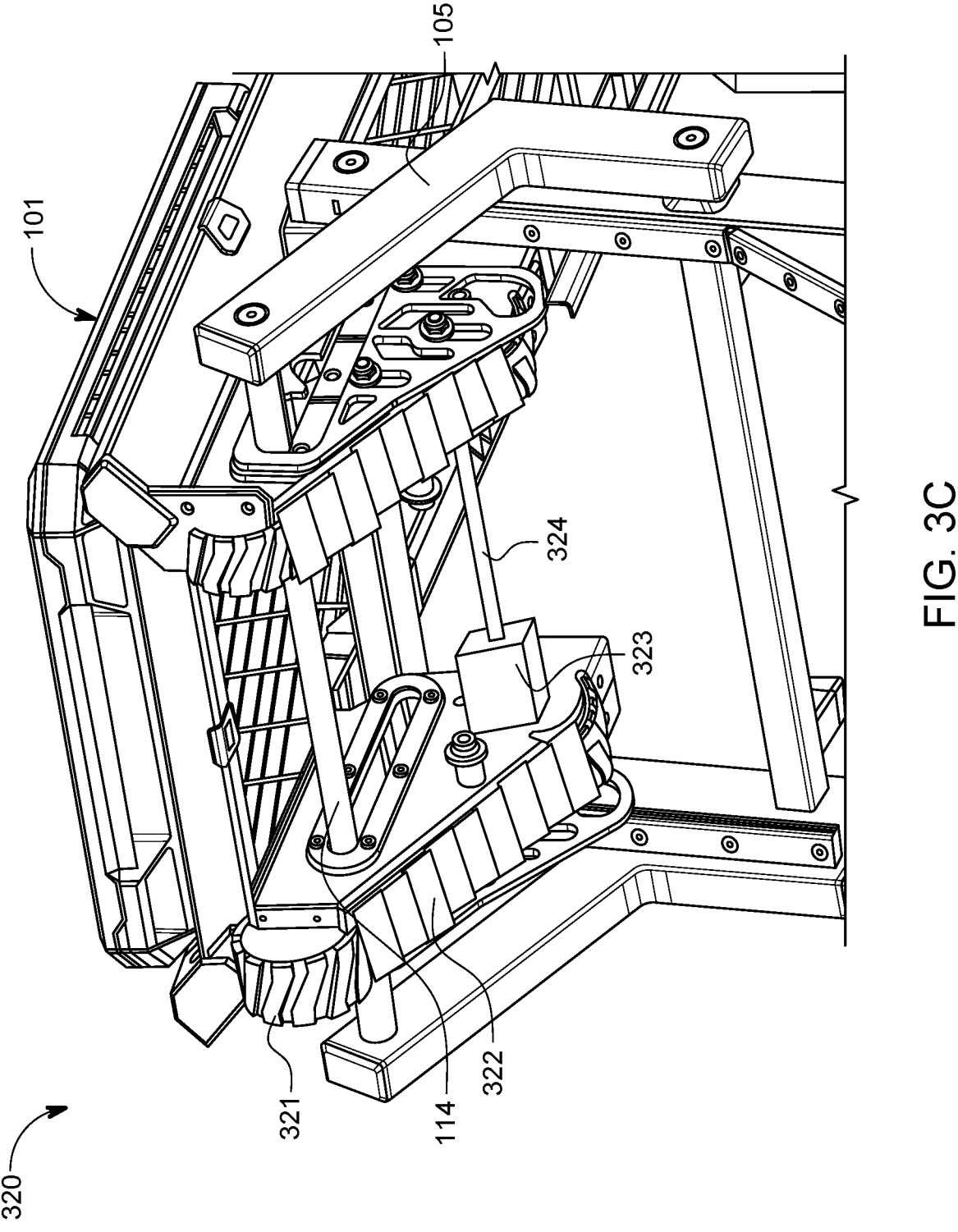
FIG. 3C shows an example motorized configuration for loading traction.

FIG. 3C shows an example motorized configuration for loading traction. In various embodiments, the motorized configuration 320 includes front loading wheels 321, ramp tracks 322, motor assembly 323, and motor drive shaft 324.

In various embodiments, the front loading wheels 321 assist in smooth loading of the transporter 101 onto a truck bed with less effort than absence of such wheels. The ramp tracks 322 may be driven by the motor assembly 323 to further assist pulling the transporter 101 up onto the truck bed without the user/operator having to push the transporter 101 manually, or pushing it with less effort compared to lack of motor assistance.

In various embodiments, the motor assembly 323 may include an electric motor, a transmission, and a drive shaft coupling to the electric motor or transmission. In other embodiments, the motor may employ a direct coupling to turn the motor drive shaft 324.

In various embodiments, the electric motor may be controlled by a motor controller interface deployed on or near the transporter handles 104. In other embodiments, the motor controller interface may be deployed elsewhere on the transporter 101.

In various embodiments, the motor drive shaft 324 is coupled with the ramp tracks 322 via belts and pullies, sprockets, gears, reduction gears to increase torque, and the like.

In various embodiments, the motor assembly 323 may drive the front ramp tracks alone, while in other embodiments the motor assembly 323 may also drive the dual-threaded lead screw to raise and lower the transporter bed.

Figure 3D:
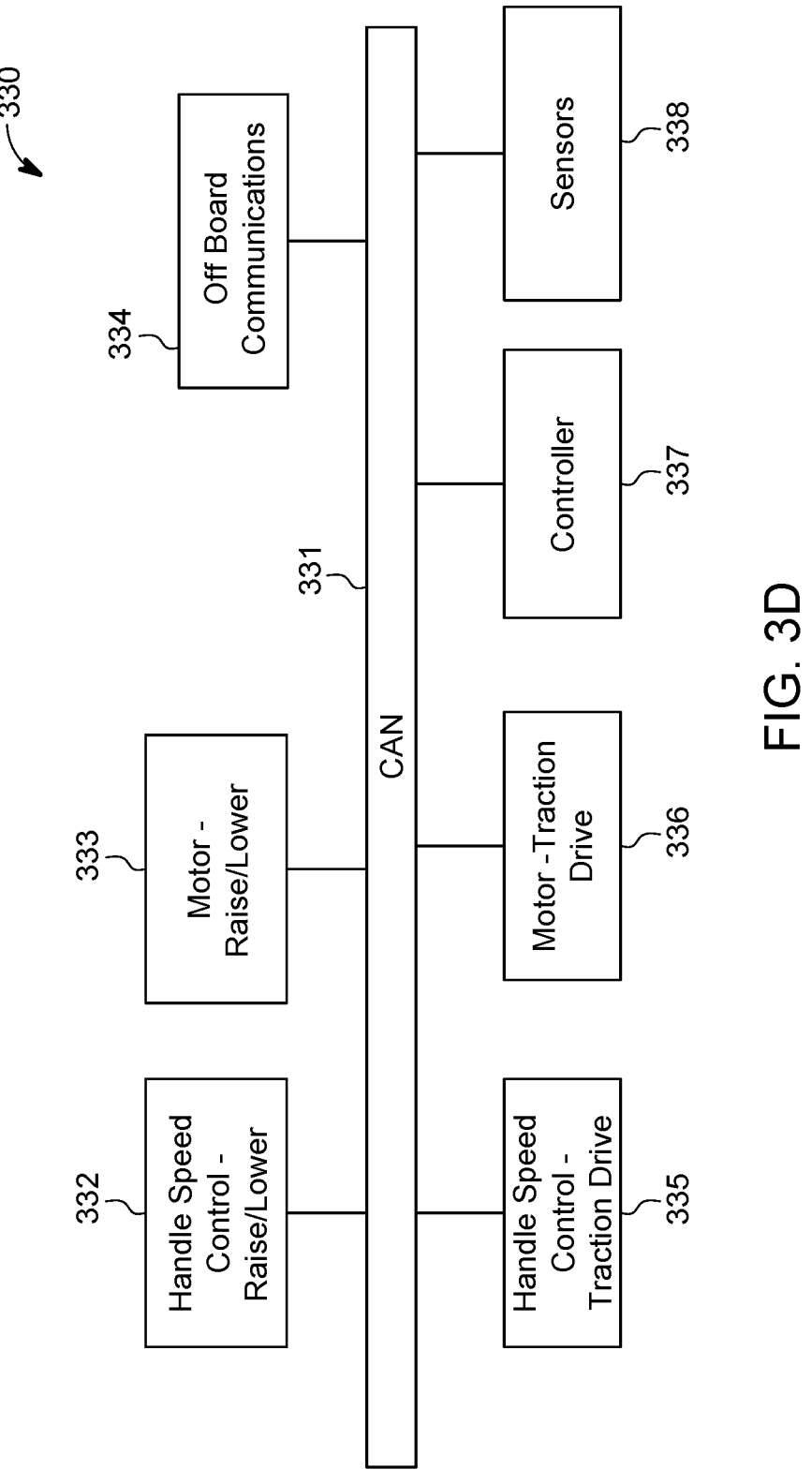
FIG. 3D shows an example motor control and communication module.

FIG. 3D shows an example motor control and communication module. In various embodiments, the motor control and communication module 330 includes a control and communications bus 331, a height change speed control unit 332, a direction control unit 333, an off-board communications unit 334, a ramp drive speed control unit 335, a motor traction drive unit 336, a motor controller unit 337, and a sensors unit 338.

In various embodiments, all the units shown communicate with each other and the motor via the control and communications bus 331. The control and communications bus 331 may include one or more control, address, and power lines. In various embodiments, the electronic units coupled with the bus may be digital or analog or a combination of both. Digital circuits may use all or some of the lines in the bus to operate, while analog circuits generally may use some of the control and power lines. As generally known in the art, analog and digital circuits have different electrical characteristics for power and communications. So, these characteristics are not further described in this disclosure.

In various embodiments, the motor control module 330 may control one or motors, each motor controlling a different part of the transporter. For example, the one or more motors may control the turning of the dual-threaded lead screw 121 to raise and lower the transporter bed, while another one of the one or more motors may control the ramp traction motion used for loading the transporter 101 onto the truck bed. In other embodiments, the same motor may control both actions.

In various embodiments, the height change speed control unit 332 may be used to control the speed of the motor for turning the dual-threaded lead screw 121 to raise and lower the transporter bed. In some embodiments, this unit may be built into one of the transporter handles 104, like a motor cycle handle. The user/operator may control the speed of the motor that raises or lowers the transporter bed by rotating the transporter handles 104 CW or CCW, depending on the design.

In various embodiments, the direction control unit 333 may be used to select the direction of movement of the transporter bed, as up (raise) or down (lower), which in turn maps to whether the dual-threaded lead screw 121 CW or CCW (depending on thread design and spiral direction). The user may use a button, a lever or other similar techniques for selecting the direction of movement.

In various embodiments, the off-board communications unit 334 may be used to send data to a computer or data center remotely located with respect to the transporter 101. It may also be used to remotely control the transporter, for example using a remote control device.

In various embodiments, the ramp drive speed control unit 335 may be used to control the speed of the ramp track 322 via controlling the speed of the motor 323. The ramp drive speed control unit 335 determines how fast the transporter 101 is pull up onto the truck bed.

In various embodiments, the motor traction drive unit 336 may be used to activate the ramp tracks 322 and/or to set its direction of motion. Once ramp tracks 322 is turned ON or its direction of motion is set, the ramp speed control unit 335 may be use to control its speed. The direction of motion determined whether the ramp is pulling the transporter 101 up onto the truck bed or backing it out, for example to reposition it.

In various embodiments, the motor controller 337 may be used as an interface between various other units on the control and communications bus 331 and the one or more motors. The motor controller 337 includes the circuitry that is used to actually drive the electric motor, such as voltage and current control and other motor control interfaces such as ON/OFF switch and speed control.

In various embodiments, the sensors unit 338 may include one or more sensors to provide status information about the transporter 101 configuration, including status of its motors. The sensors may provide information about height of the transporter bed, speed of the motor, and the like. The sensors may also provide feedback to the various units coupled with the control and communications bus 331 for the purpose of control in a feedback control system.

Figure 3E:
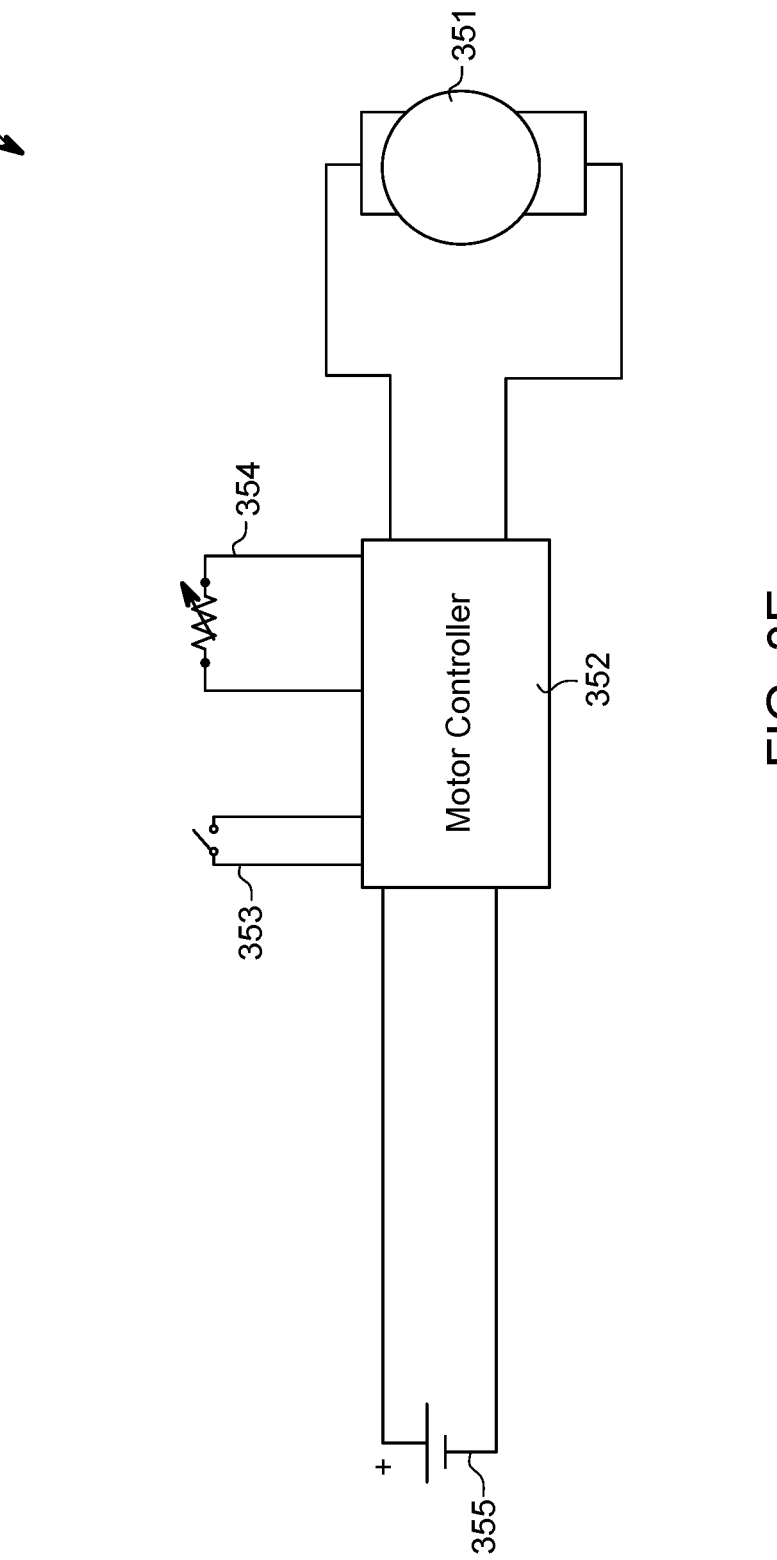
FIG. 3E shows an example motor control circuit.

FIG. 3E shows an example motor control circuit. In various embodiments, the motor control circuit 350 includes a motor 351 a motor controller 352, an ON/OFF switch 353, potentiometer 354 and a batter 355.

In various embodiments, the motor 351 may be one of the motors deployed in the transporter 101, such as the motor in the motor assembly 323.

In various embodiments, the motor controller 352 may be the same as the motor controller 337 of FIG. 3D, described above.

In various embodiments, the battery 355 may be the same as the battery 312 of FIG. 3B.

In various embodiments, the potentiometer 354 is used for speed control of the motor 351 and may be directly or indirectly part of the various speed control units described with respect to FIG. 3D.

III. Truck Bed Edge Detector

Figure 4A:
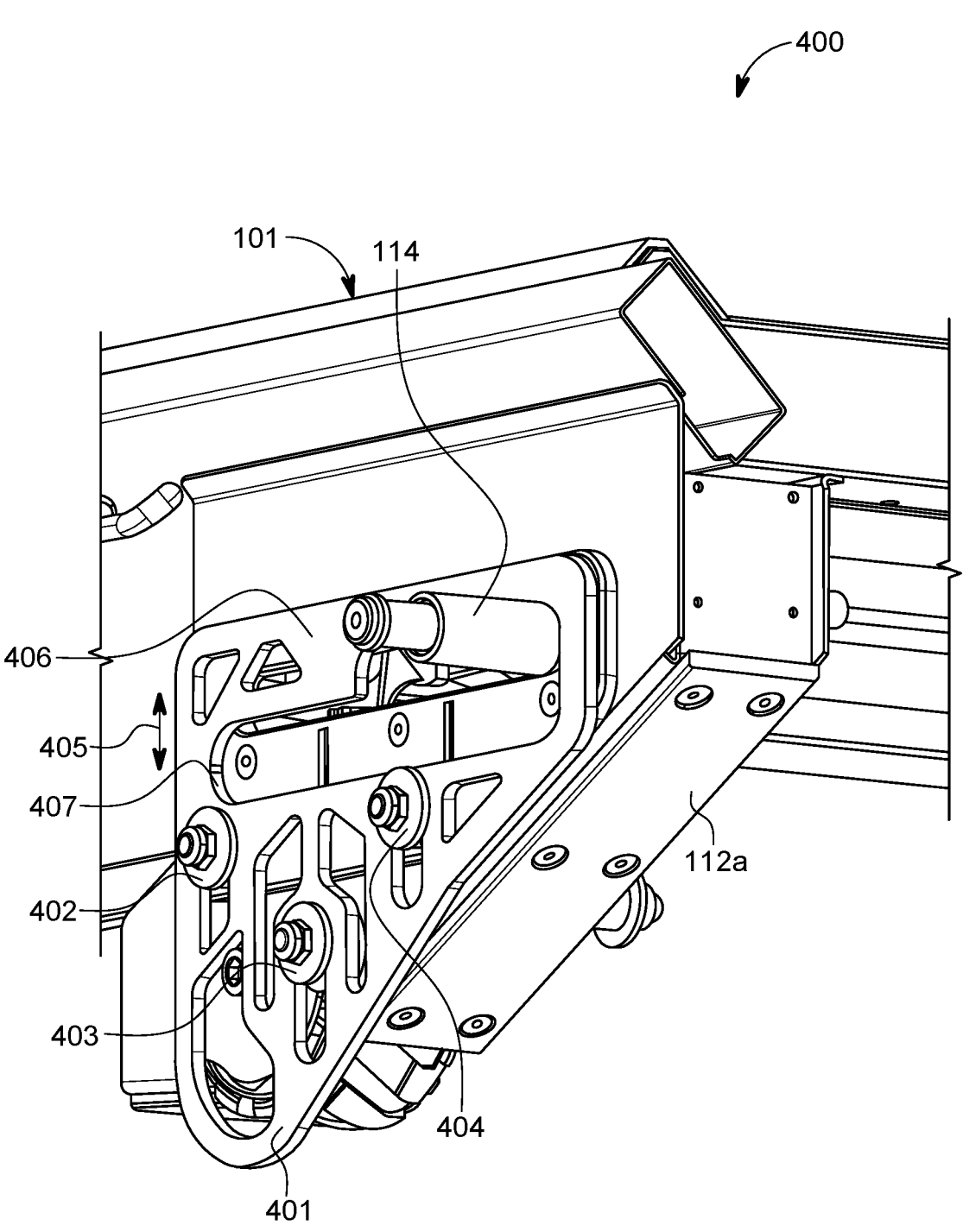
FIG. 4A shows an example mechanical edge detector.

FIG. 4A shows an example mechanical edge detector. In various embodiments, the mechanical edge detector 400 includes detector plate 401, guide slots 402, 403, and 404, movement direction 405, last brake point 406, and front struts slot 407.

In various embodiments, the detector plate 401 may have a front side that is at an angle with respect to the side beams 108b (see FIG. 1A) and the edge of the truck bed. When the transporter 101 is pushed towards the truck bed to be load up onto the truck, first the transporter loading ramps 112a and 112b make contact with the edge of the truck bed. The detector plate 401 on the exterior of and substantially aligned with the approximately triangular-shaped front end of the transporter 101, as shown in at least FIGS. 1A and 1B. The front side of the detector plate 401 is also substantially parallel with transporter loading ramps 112a and 112b. The detector plate 401 is constrained by guide slots 402-404 to move up and down vertically as indicated by the movement direction 405 arrow. Initially, before being loaded onto the truck bed, the front struts cross bar 114 is captured and constrained within the front struts slot 407 by the front struts rachet teeth 125, which may also act as safety brakes during unloading of the transporter 101 from the truck bed. When the transporter 101 is pushed further into the truck bed, the force imparted by the truck bed on the front side of the detector plate 401 has a vertical force component that pushes up the detector plate 401. This action releases the front struts cross bar 114 from the front struts rachet teeth 125 and allows the front struts cross bar 114 to slide rear-wards within the front struts slot 407 towards the last brake point 406, where it stops. This movement of the front struts cross bar 114 allows the front legs struts 105 to the front legs 103 to rotate about pivot point B (see FIG. 2C) and fold underneath the transporter bed.

This way, the detector plate 401 automatically detects the edge of the truck bed and releases the front legs 103 to fold, without active participation of the operator other than pushing the transporter 101 onto the truck bed.

Figure 4B:
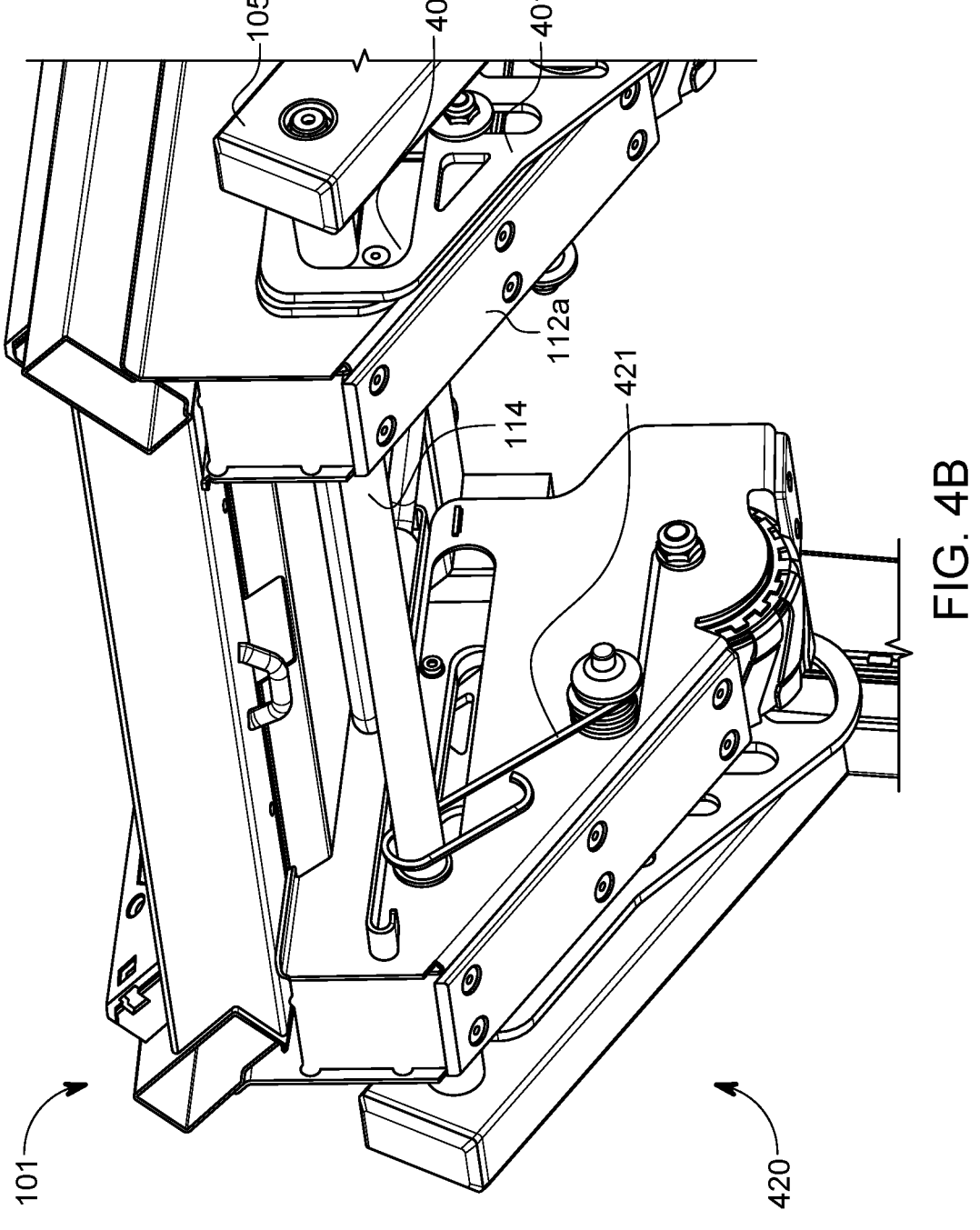
FIG. 4B shows an example return spring of the mechanical edge detector of FIG. 4A.

FIG. 4B shows an example return spring of the mechanical edge detector of FIG. 4A. In various embodiments, arrangement 420 includes a return spring 421.

In various embodiments, the return spring 421 may be anchored on a body of the transporter 101 and pushes the front struts cross bar 114 towards the front of the transporter 101 to keep the front leg struts 114 locked within the front struts rachet teeth 125.

In various embodiments, when the detector plate 401 is in its bottom position and the front struts rachet teeth 125 are engaged with the front struts cross bar 114, and the force from the truck bed on the front side f the detector plate 401 is removed, the return spring 421 pushes the front struts cross bar 114 to the front most tooth of the front struts rachet teeth 125. In this configuration, the front legs are fully extended and locked and support the weight of the transporter 101.

IV. Foldable Sliding Legs

Figure 4C:
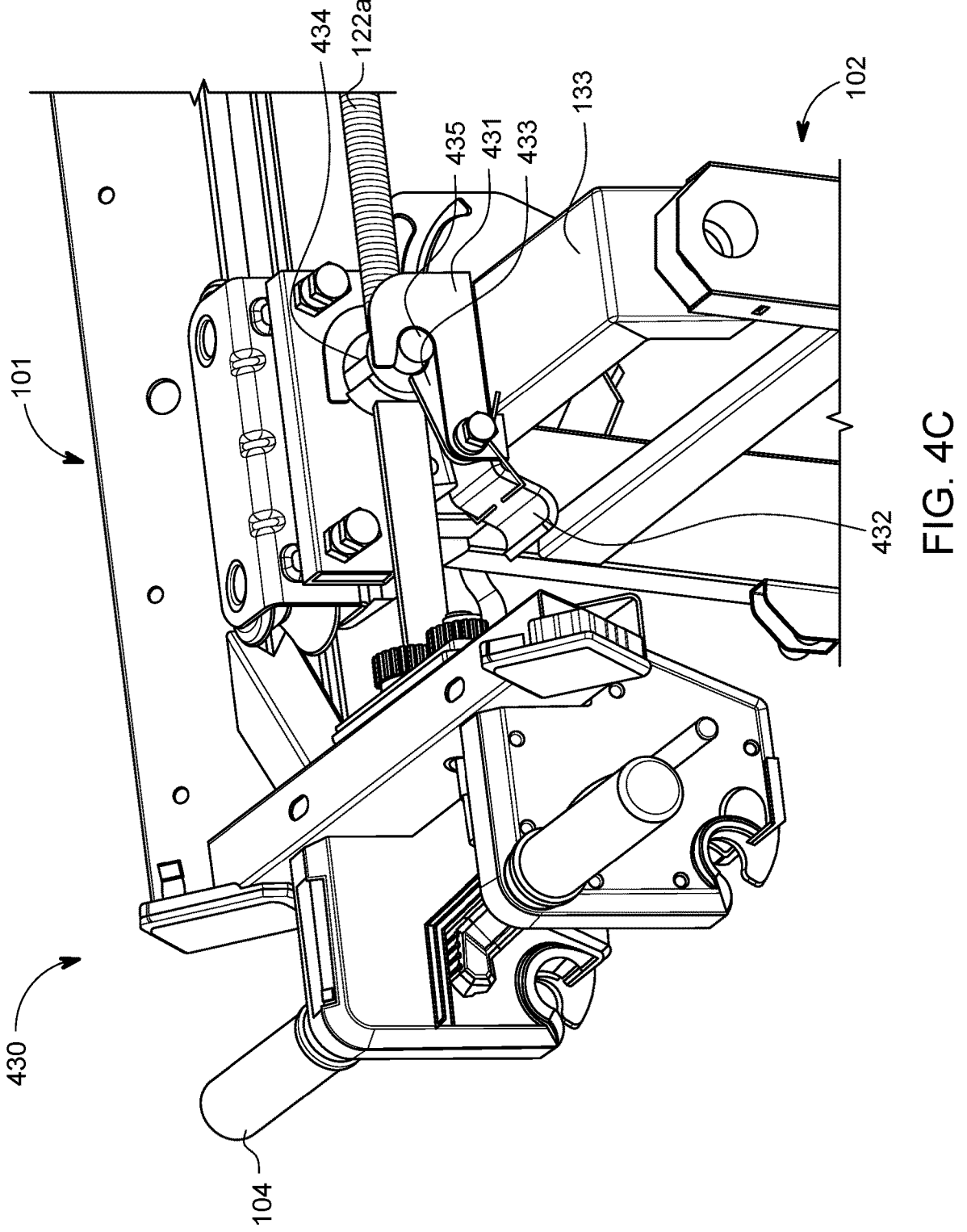
FIG. 4C shows an example lead screw coupling with the transporter rear legs.

FIG. 4C shows an example lead screw coupling with the transporter rear legs. In various embodiments, the lead screw coupling 430 includes rear carriage hook 431 attached to rear leg carriage 133, rear carriage lock release 432 attached to rear leg carriage 133, rear carriage lock 433 attached to rear carriage lock release 423, rear carriage nut 434 attached to dual-threaded lead screw 121, and rear nut axel 435 attached to rear carriage nut 434.

In various embodiments, the rear lead screw 122a is coupled with the rear leg carriage 133, with the rear carriage lock 433 engaged (locked) keeping the rear nut axel 435 locked inside the rear carriage hook 431. In this configuration, if the rear lead screw 122a is turned, the rear leg carriage 133 is moved in the direction the rear lead screw 122a is pushing. The movement of the rear leg carriage 133 causes the rear legs 102 to rotate accordingly about pivot point E (see FIG. 2C).

In various embodiments, the rear carriage lock release 432 may be pushed up by the operator manually to release the rear carriage lock 433 and release the rear nut axel 435 from the rear carriage hook 431. Once the rear leg carriage 133 is pushed away a small distance (about half an inch) towards the front end of the transporter 101, the rear carriage lock 433 moves under and away from the rear nut axel 435 and can no longer capture and lock the rear nut axel 435 within the carriage hook 431. This action causes the rear carriage nut 434 to be decoupled from the rear leg carriage 133. In this configuration, the rear leg carriage 133 may freely move along the length of the rear lead screw 122a back and forth. This configuration is used to slide the rear legs 102 under the transporter bed and make the transporter lay flat in the truck bed (without legs 102 and 103 supporting it). When the rear leg carriage 133 is pushed back towards the rear section of the transporter 101 all the way, the rear carriage lock 433 crosses under the rear nut axel 435 and then snaps back into position under spring force to lock the rear nut axel 435 within the carriage hook 431.

Figure 4D:
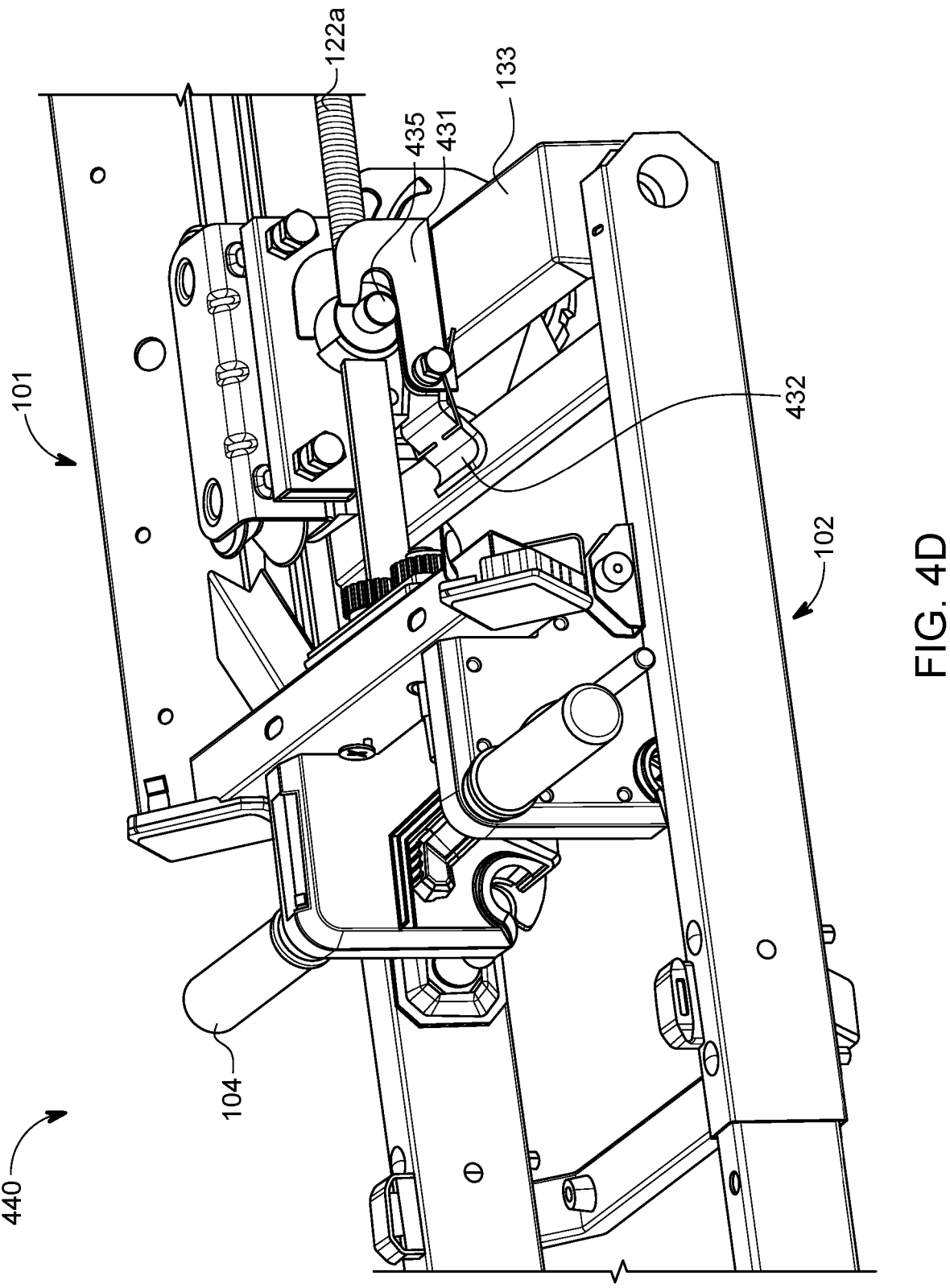
FIG. 4D shows the example lead screw coupling decoupled from transporter rear legs.

FIG. 4D shows the example lead screw coupling decoupled from transporter rear legs. In various embodiments, the lead screw coupling decoupled configuration 440 shows rear carriage nut 434 decoupled from the rear carriage 133, as described above.

In various embodiments, the rear carriage lock release 432 has been actuated by the operator and the rear nut axel 435 is released from the rear carriage hook 431, and thus, the rear carriage 133 may move along the rear lead screw 122a freely. In this configuration, turning the dual-threaded lead screw 121 will have no effect on the movement of the rear leg carriage 133. If the rear struts cross bar 126 is detached from the rear struts hook 123, the rear legs 102 may be rotated to be folded using rear legs handles 106. At this point, the rear legs may be pushed to slide forward under the transporter bed and parallel to the dual-threaded lead screw 121 to be placed under the transporter and make the transporter flat when placed in the truck bed.

V. Articulating Legs & Height Adjustment

Figure 4E:
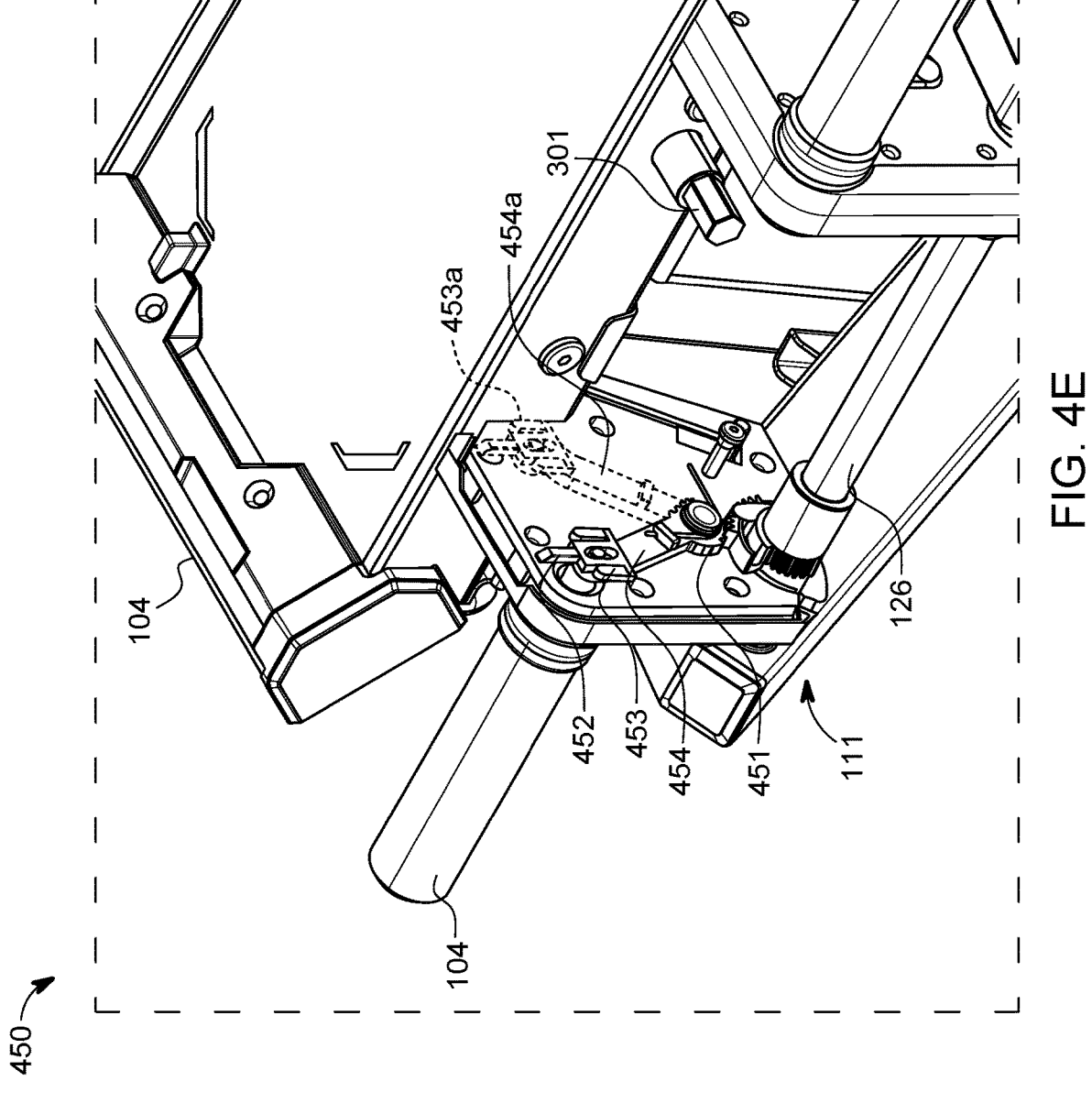
FIG. 4E shows an example transporter height indicator mechanism.

FIG. 4E shows an example transporter height indicator mechanism. In various embodiments, the transporter height indicator mechanism 450 includes indicator gears 451, indicator tip 452, slotted slider 453, indicator lever 454, slotted slider in a second position 453a, and indicator lever in a second position 454a.

In various embodiments, the rear struts cross bar 126 is coupled with the dual-threaded lead screw 121 and as the dual-threaded lead screw 121 rotates to lower and raise the transporter bed, the rear struts cross bar 126 also rotates accordingly, in turn rotating the indicator gears 451, which also rotates the height indicator lever 454. The indicator lever 454 may have a pin or protrusion that is fitted in the slot of the slotted slider 453. As the height indicator lever 454 rotates, its pin slides up or down the slotted slider 453 slot to keep the slotted slider 453 and the indicator tip 452 level, without moving up and down, but only side to side.

Hence, as the indicator tip 452 moves from side to side (or front and back) each position of the indicator tip 452 will corresponding to a particular height of the transporter bed. The second position of the indicator lever 454a and the second position of the slotted slider 453a depict this movement of the indicator and the positions it indicates.

VI. Lockable Storage Containers & Tools Platform

Figure 5A:
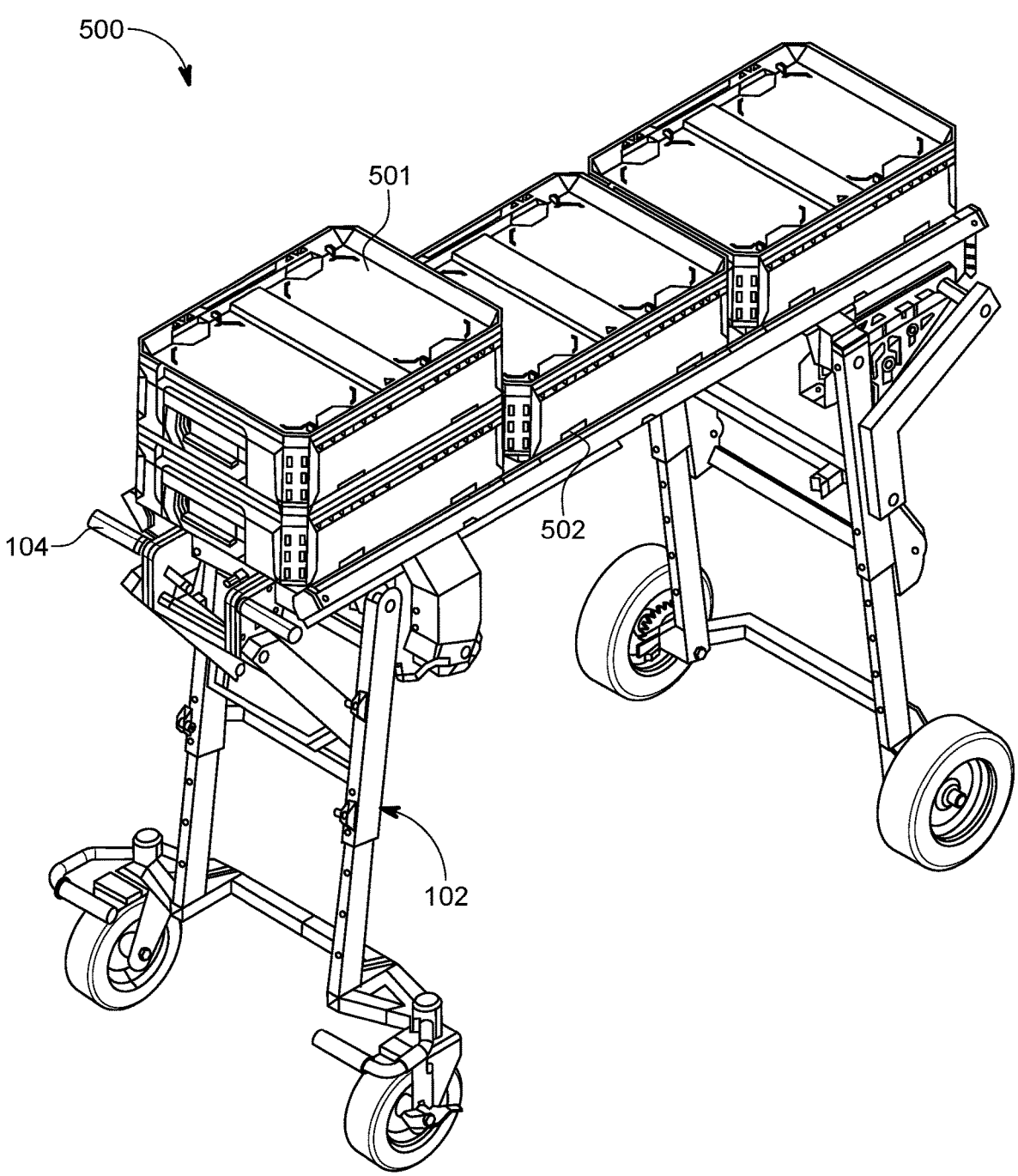
FIG. 5A shows an example application of the transporter of FIG. 1A carrying storage boxes.

FIG. 5A shows an example application of the transporter of FIG. 1A carrying storage boxes. In various embodiments, the storage box application arrangement 500 includes stackable storage boxes 501 and latch interface 502 to allow securing the storage boxes 501 to transporter 101.

In various embodiments, the stackable storage boxes 501 may include lock mechanisms at the bottom surface that allow latching multiple storage boxes on top of each other (in a stack configuration) and also latching the bottom box to the transporter bed for secure transportation. Generally, the stackable storage boxes 501 may carry heaving tools, parts, materials, equipment, and other similar items that may be used in an industrial or commercial application, such as the construction industry, that make the storage boxes heavy and difficult to handle, and especially, to transport or carry around at a job site. For example, if a single contractor wants to carry heavy construction tools that may weigh, singly or collectively, tens or hundreds of pounds, from a truck to a point of application at the job site, the contractor may face substantial difficulty and expenditure of time, energy and effort, and risk of injury. Being able to leave the heavy storage boxes on a transporter and being able to load/unload the transporter onto/from the back of the truck can significantly reduce such burdens and risks, and make it more efficient, time-wise and effort-wise, to perform the job. The significance of this system is further realized when the contractor is working alone and independently, by reducing cost of labor and increasing work flexibility.

In various embodiments, the transporter bed may be configured to have several open-top compartments defined by two or more adjacent cross beams 108a (see FIG. 1A) with a concave shape and slanted sides. In other embodiments, the open-top compartments may not be concave, but have other shapes, such as flat, curved, or other suitable shapes for receiving and holding containers. Similarly, the bottom of the stackable storage boxes 501 may be convex with slanted or beveled sides (on sidewalls near the bottom of the boxes) that match the slanted sides of the open-top compartments of the transporter bed. Once, a stackable storage box 501 is placed or dropped on top of one of the open-top compartments, it automatically centers itself within the open-top compartment and the latches on the bottom of the storage box are aligned with the latch receivers 107 of the transporter bed. The latches on the storage box may automatically enter into and engage the latch receivers 107 and lock the storage box in place.

Figure 5B:
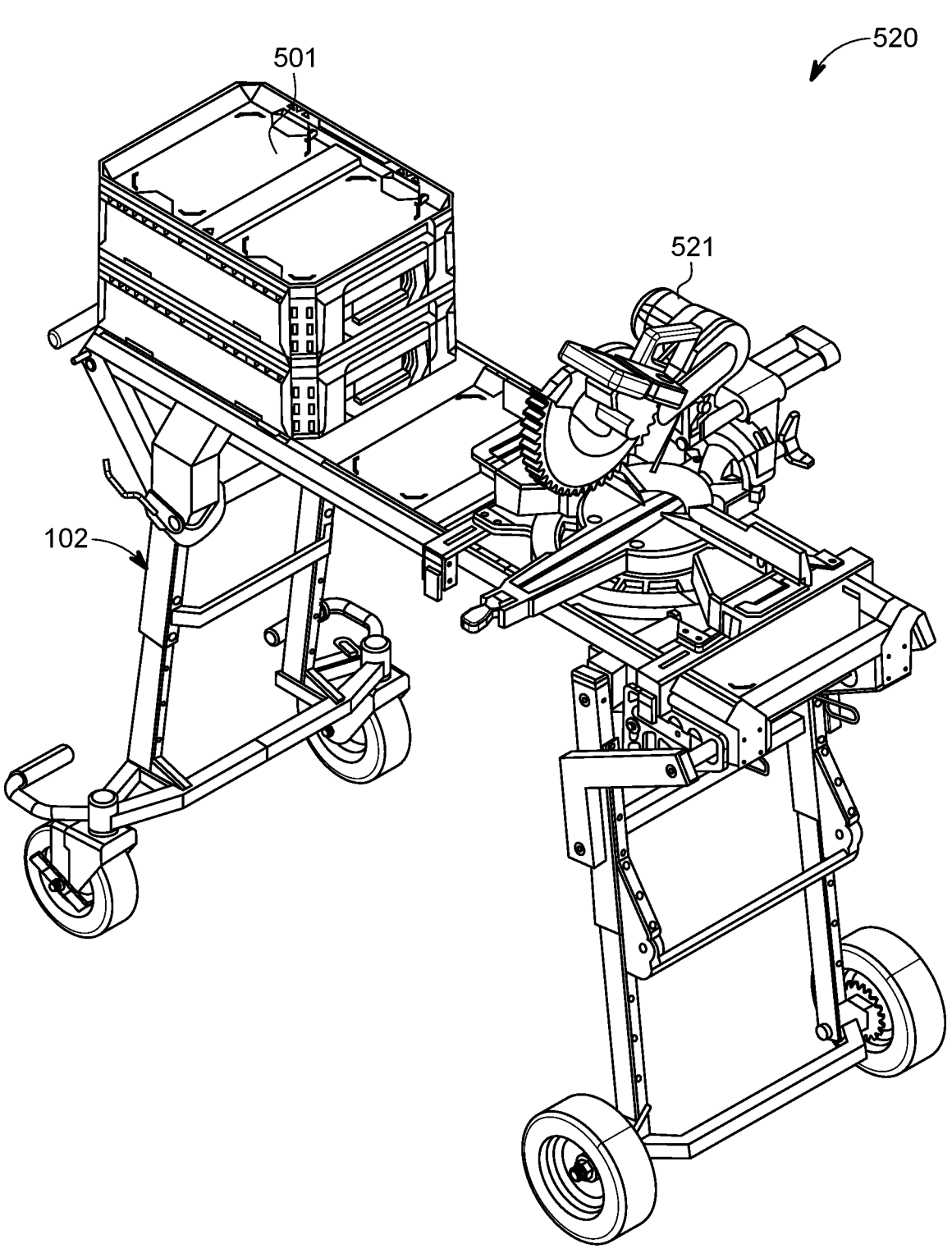
FIG. 5B shows an example application of the transporter of FIG. 1A used as a base for a miter saw.

FIG. 5B shows an example application of the transporter of FIG. 1A used as a base for a miter saw. In various embodiments, the miter saw application arrangement 520 includes a miter saw 521.

In various embodiments, power tools, such as a miter saw 521, that may need a workbench for use, may be fastened on the transporter bed to create a mobile workbench or platform arrangement. The base of the power tool may be clamped to the transporter bed by using C-clamps or by other suitable techniques. The height of the transporter bed may be adjusted, by turning the dual-threaded screw 121, to create a suitable working height for using the power tool.

Figure 5C:
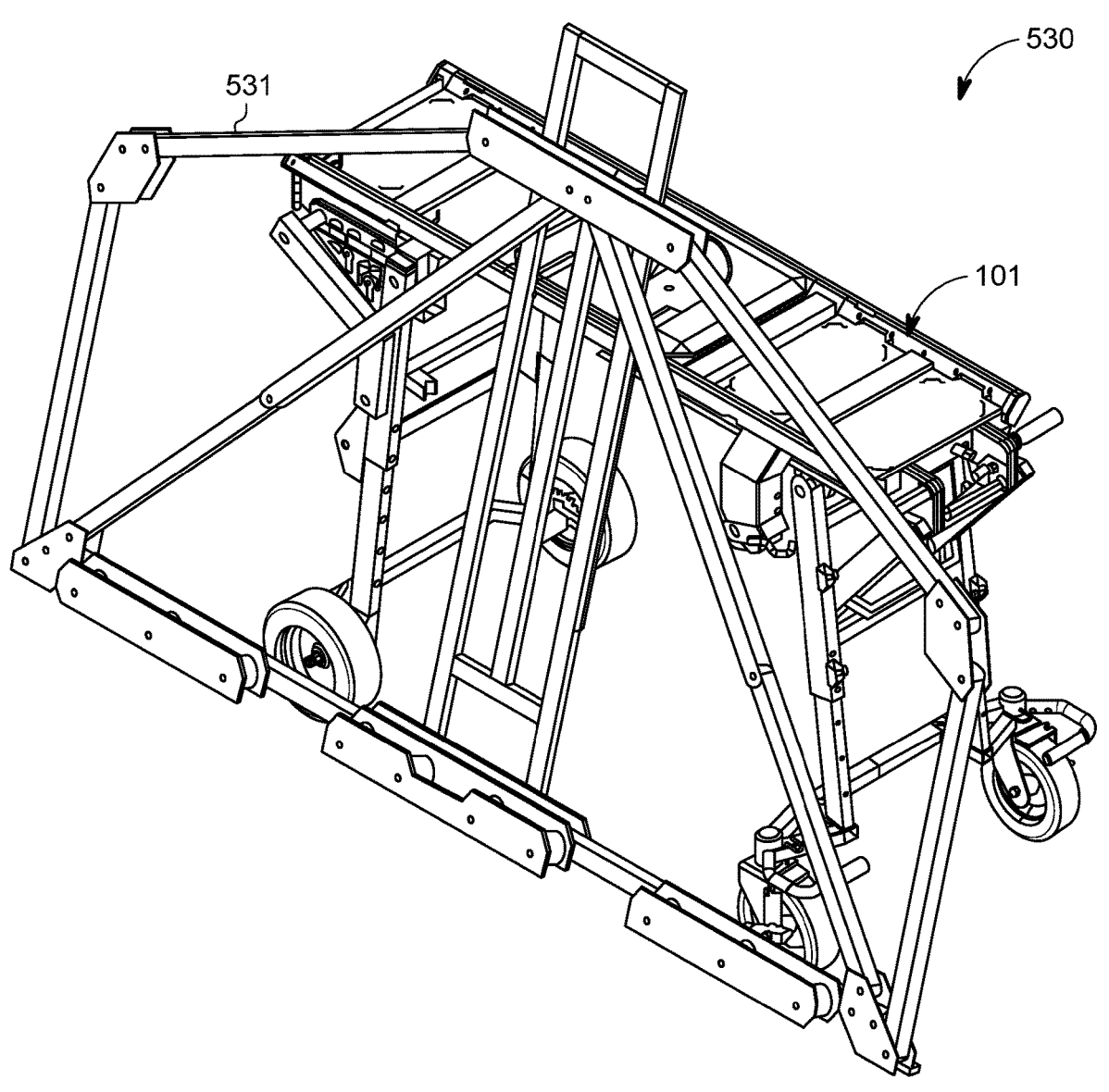
FIG. 5C shows an example application of the transporter of FIG. 1A used as a base for a panel saw.

FIG. 5C shows an example application of the transporter of FIG. 1A used as a base for a panel saw. In various embodiments, the panel saw application arrangement 530 includes a panel saw 531.

In various embodiments, large power tools, such as a panel saw 531, that may need a stand or platform for use, may be fastened to the transporter to create a mobile stand or platform arrangement. The power tool may be clamped to the transporter bed and/or by using C-clamps or by other suitable techniques. The height of the transporter bed may be adjusted, by turning the dual-threaded screw 121, to create a suitable and stable working height for using the power tool.

VII. Loading and Unloading the Transporter

Figure 6A:
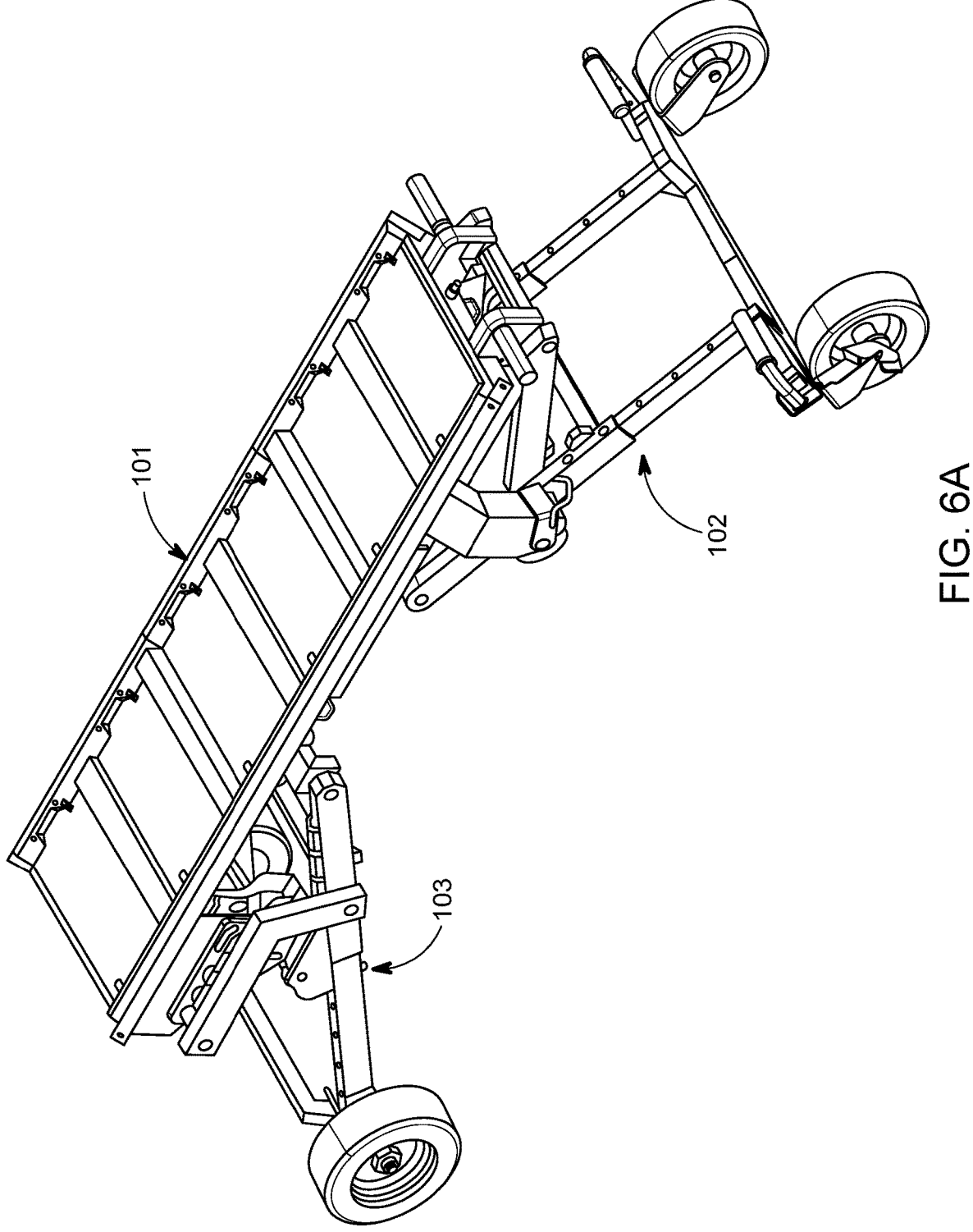
FIG. 6A shows the example transporter of FIG. 1A in a lowered state.

FIG. 6A shows the example transporter of FIG. 1A in a lowered state. In various embodiments, the transporter lowered state 600 shows the transporter bed lowered by opening up the front and rear legs.

In various embodiments, the transporter bed may be raised or lowered by turning the dual-threaded lead screw 121 to pull the front leg carriage 132 and rear leg carriage 133 towards the center of the transporter, hence pushing the front leg wheels 116 and rear leg wheels 117 away from each other and opening rear legs 102 and front legs 103 at an angle with respect to the transporter bed, as shown. In this configuration, the transporter bed is lowered and gets closer to the ground.

Figure 6B:
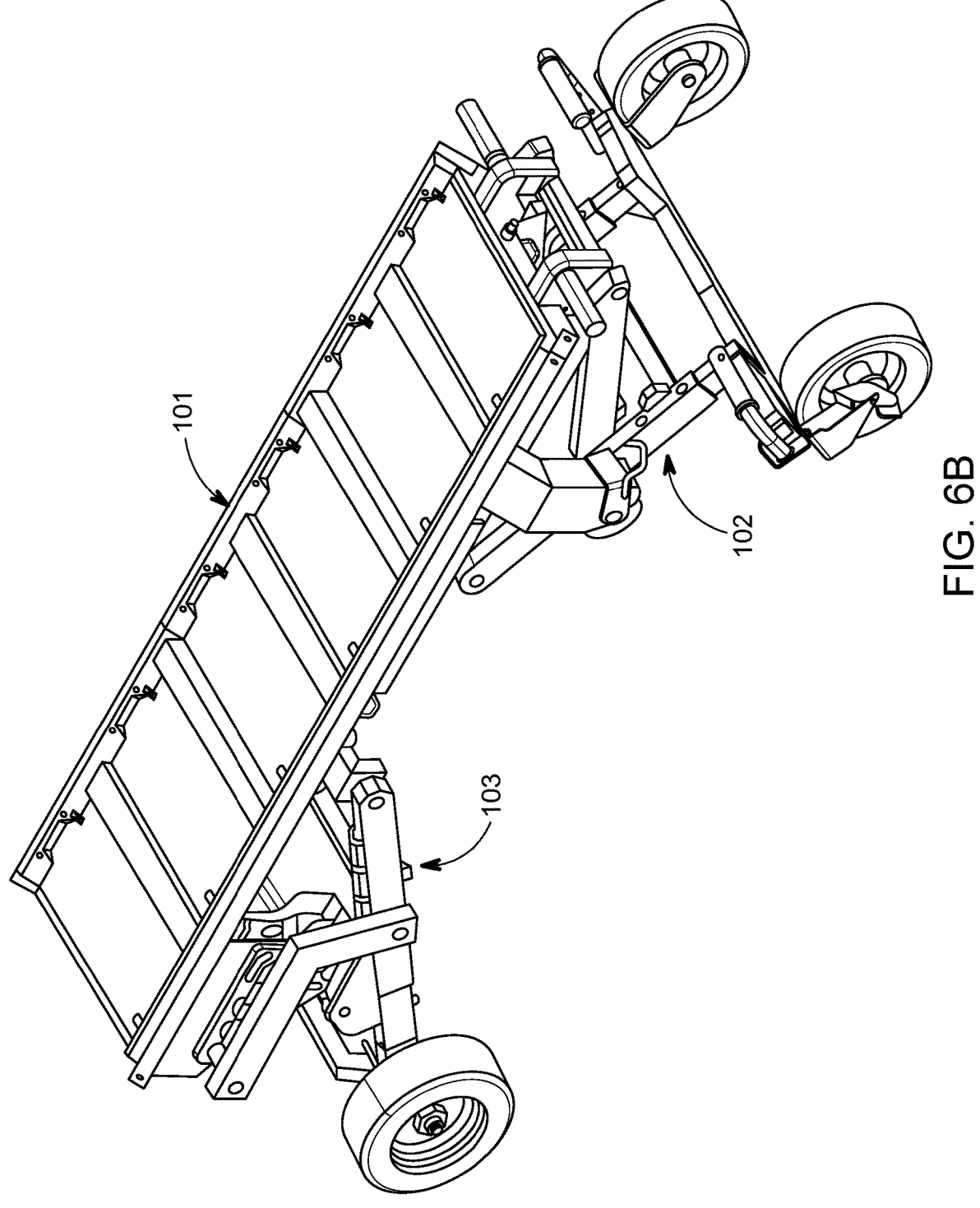
FIG. 6B shows the example transporter of FIG. 1A in a lowered state and with legs retracted to a shorter length.

FIG. 6B shows the example transporter of FIG. 1A in a lowered state and with legs retracted to a shorter length. In various embodiments, the transporter lowered state with retracted legs arrangement 620 shows the transporter bed lowered by opening up the front and rear legs, and in addition, shortening the legs.

In various embodiments, the transporter bed may be raised or lowered by turning the dual-threaded lead screw 121 to pull the front leg carriage 132 and rear leg carriage 133 towards the center of the transporter, hence pushing the front leg wheels 116 and rear leg wheels 117 away from each other and opening rear legs 102 and front legs 103 at an angle with respect to the transporter bed, as shown. In this configuration, the transporter bed is lowered and gets closer to the ground. The transporter bed may be additionally lowered by shortening the telescopic rear legs 102 and front legs 103. The two operations of angling the legs outwards and shortening the telescopic legs are independent and may be performed singly or in combination. In this configuration, the shortening of the legs allows for a more compact configuration compared with angling the legs alone because shorter legs do not extend as far.

FIGS. 7A-7D depict an example loading process of the transporter 101 onto a truck bed.

Figure 7A:
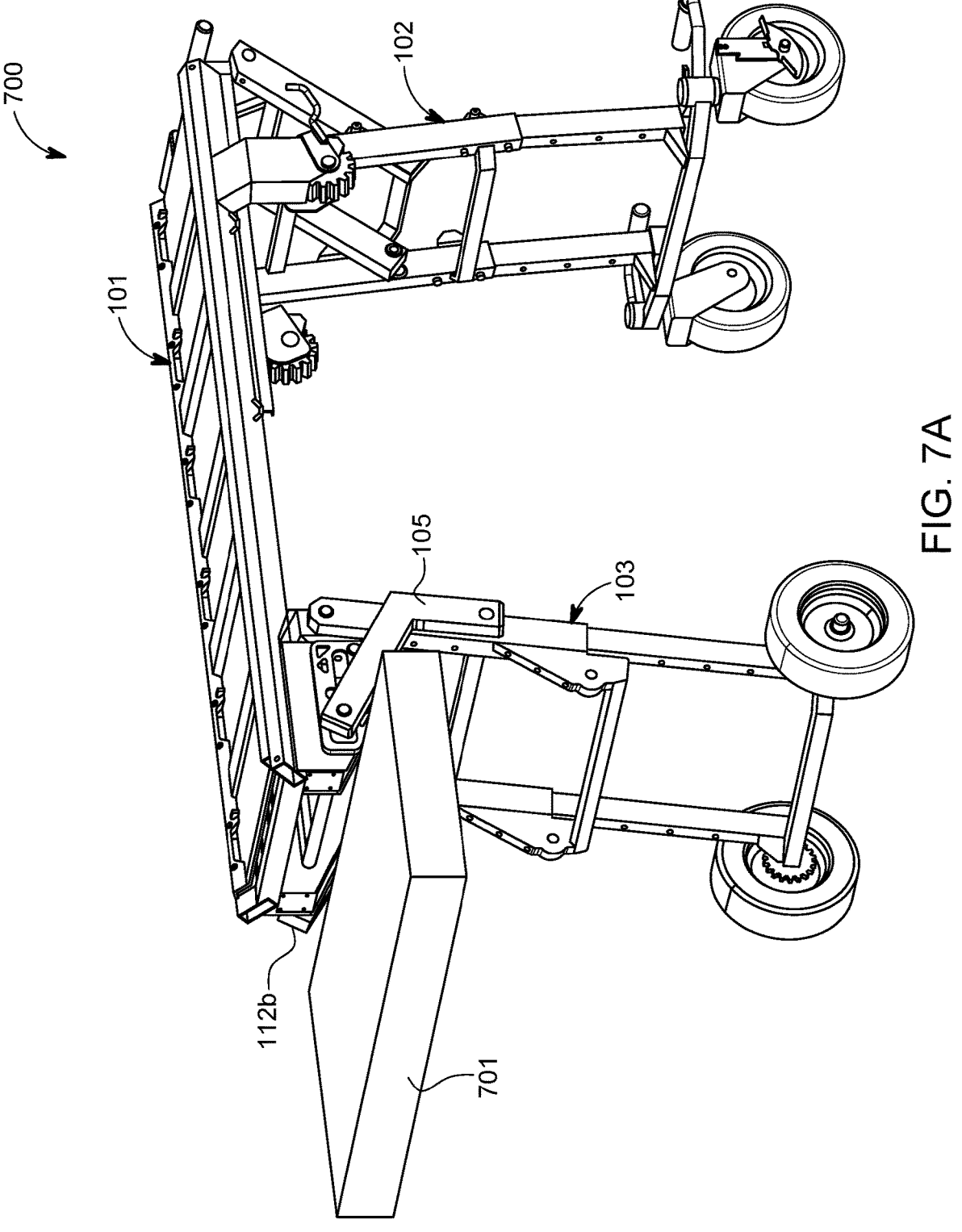
FIG. 7A shows an example first state in loading the transporter of FIG. 1A onto a truck bed.

FIG. 7A shows an example first state in loading the transporter of FIG. 1A onto a truck bed. In various embodiments, the first loading state 700 includes a truck bed 701.

In various embodiments, loading the transporter 101 onto a truck involves several distinct stages that start with the first state of the transporter 101 and the truck bed 701. The truck bed 701 may be a tail gate of a pickup truck or the loading deck of a bigger truck. The transporter 101 may be loaded by a single operator without having to support or carry the weight of the transporter and/or its cargo, such as storage boxes and power tools. In the first state, the front end of the transporter 101 is pushed by the operator to touch the edge of truck bed 701, as shown. In this state, the loading ramps 112a and 112b (see FIG. 1B) make physical contact with the edge of the truck bed 701. The rear legs 102 and front legs 103 may be pre-adjusted for the terrain and/or the height of the truck bed 701, such that the loading ramps 112*a* and 112*b* are slightly higher than the truck bed 701 and are positioned to climb unto the truck bed 701.

Figure 7B:
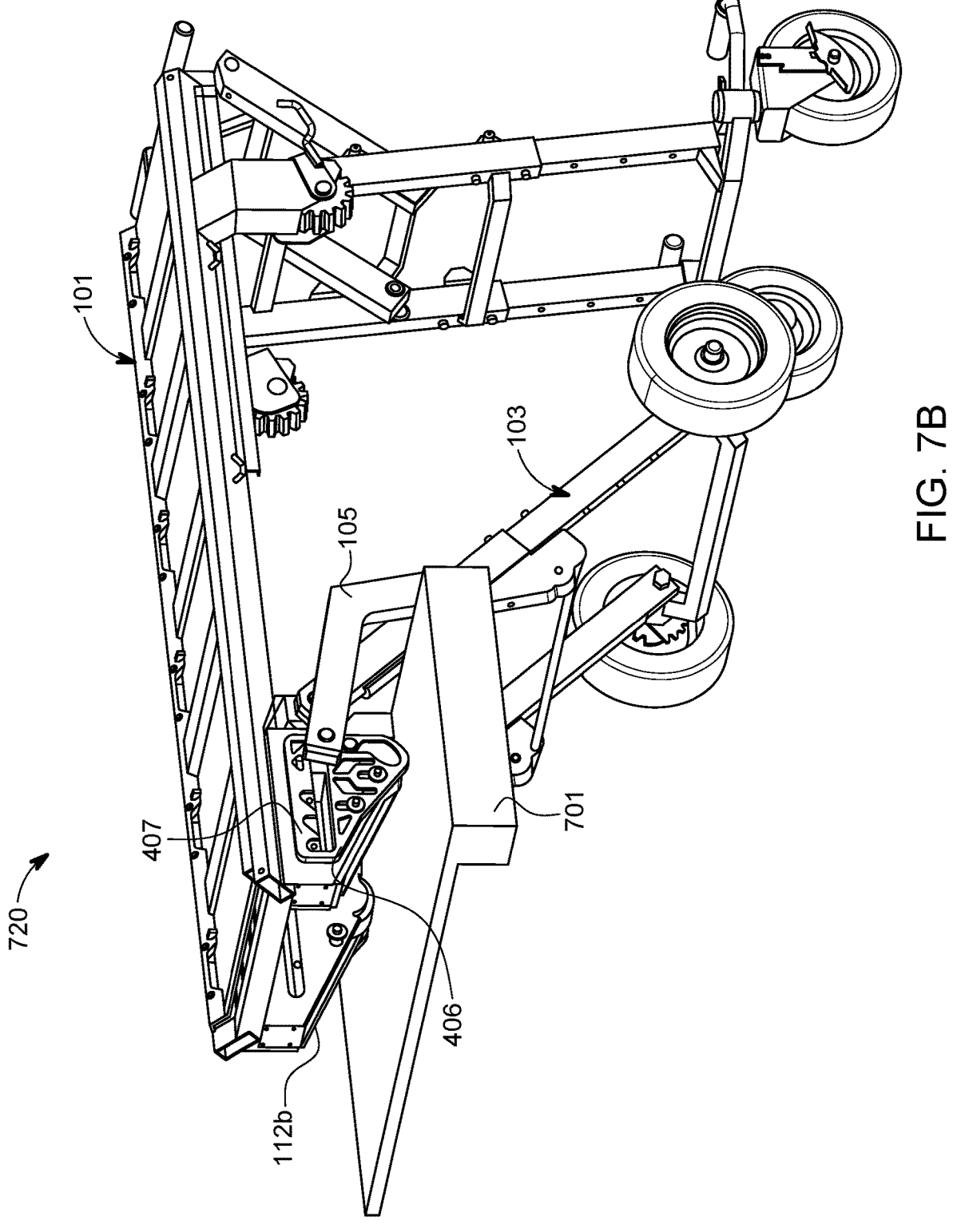
FIG. 7B shows an example second state in loading the transporter of FIG. 1A onto a truck bed with front legs rotated up.

FIG. 7B shows an example second state in loading the transporter of FIG. 1A onto a truck bed with front legs rotated up. In various embodiments, the second loading state 720 shows the front legs 103 are partially folded and lifted off the ground.

In various embodiments, in the second loading state, the transporter 101 is further pushed against the truck bed 701 by the operator, or pulled up by the motorized ramp tracks 322 (see FIG. 3C) providing sufficient force to lift the detector plate 401 (see FIG. 4A) and releasing front leg struts cross bar 114 to allow the front legs 103 to start folding up towards the transporter bed. At this point, the front-end weight of the transporter 101 and any cargo it may be carrying is borne by the loading ramps 112*a* and 112*b*, instead of the front legs, which are now off the ground. The rear-end weight is still carried by the rear legs 102 still resting on the ground. The single operator is also carrying no weight load (downward force, against gravity) and may only be pushing the transporter 101 towards the truck bed 107, in absence of motorized ramp tracks 322. The front legs loading ramps 115 are engaged at this stage to facilitate sliding the front legs 103 up the truck bed 701.

Figure 7C:
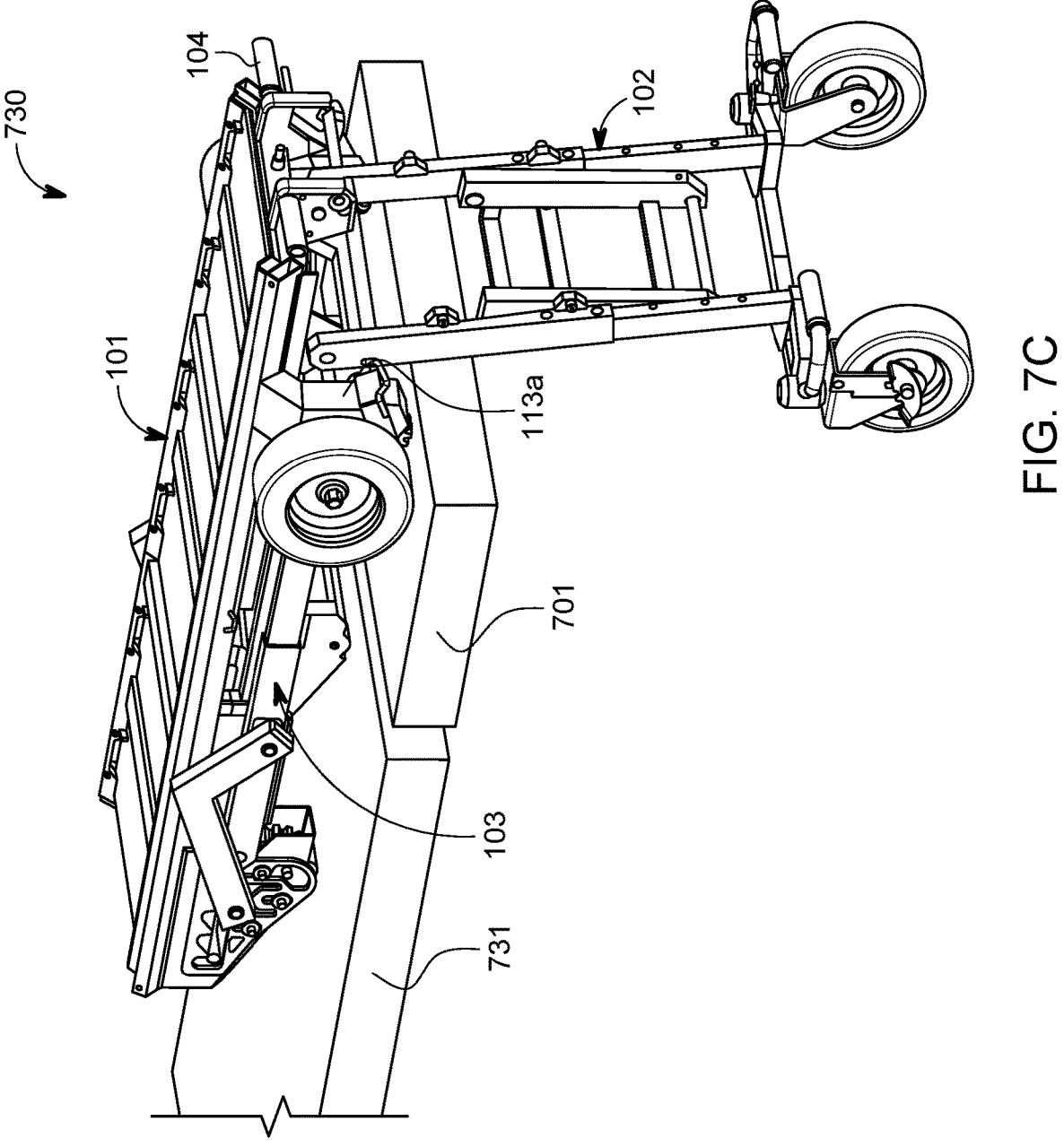
FIG. 7C shows an example third state in loading the transporter of FIG. 1A onto a truck bed with the rear legs at the edge of the truck bed.

FIG. 7C shows an example third state in loading the transporter of FIG. 1A onto a truck bed with the rear legs at the edge of the truck bed. In various embodiments, the third loading state 730 includes a main or inner truck bed 731 located behind the tail gate or truck bed 701 to receive the folded transporter 101.

In various embodiments, in this state, the front legs 103 are fully folded and placed under the transporter bed. The rear legs 102 are now butted against the edge of the truck bed 701, the rear legs struts 111 (see FIG. 1B) have been decoupled from the rear struts hook 123 (see FIG. 1C), and the rear legs 102 are free to rotate about pivot point E (see FIG. 2C) to fold up towards the transporter bed. At this point, the operator may use the rear legs handles 106 to lift the rear legs 102 off the ground and slide them under the transporter bed. The operator may also use the rear carriage lock release 432 to decouple the rear legs carriage 133 from the rear lead screw 122*a*, and allow the operator to freely slide the rear legs 102 under the transporter bed.

Figure 7D:
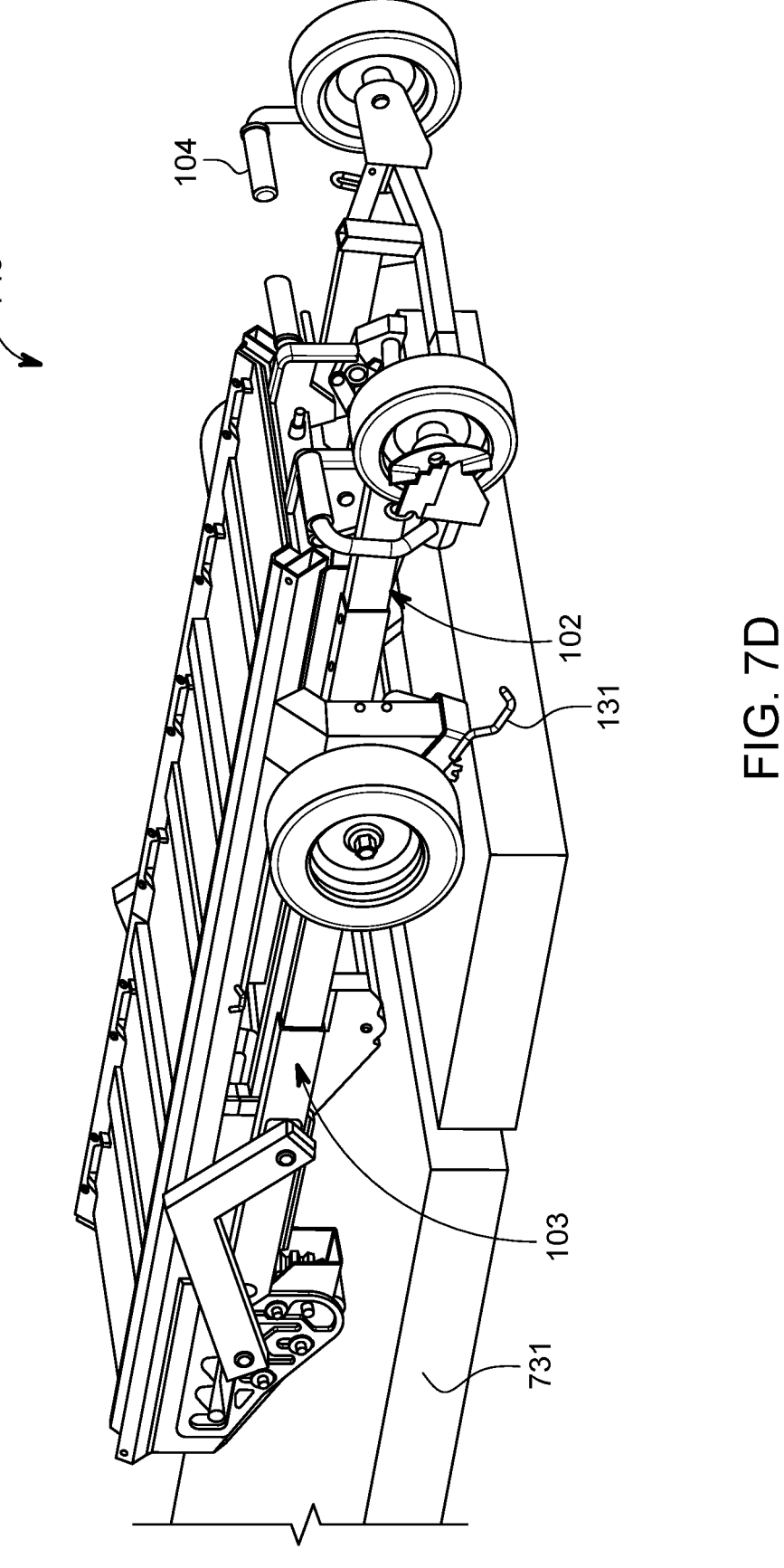
FIG. 7D shows an example fourth state in loading the transporter of FIG. 1A onto a truck bed with the rear legs folded up onto the truck bed.

FIG. 7D shows an example fourth state in loading the transporter of FIG. 1A onto a truck bed with the rear legs folded up onto the truck bed. In various embodiments, the fourth loading state 740 shows the transporter 101 in a fully folded configuration, ready to be pushed into the truck bed 701 or the inner truck bed 731 (for different truck configurations).

In various embodiments, at this point, the rear edge detectors 131 is in the locked-state, keeping the truck bed wheels 113*a* and 113*b* locked. Once the transporter 101 is pushed a little distance further into the truck, the rear edge detectors 131 enter the unlocked-state, allowing the truck bed wheels 113*a* and 113*b* to roll freely and move further into truck. At this stage, the rear wheels 102 may be pushed in under the transporter bed to make the transporter 101 fully folded and loaded onto the truck.

FIGS. 8A-8D depict an example unloading process of the transporter 101 from a truck bed. These steps are similar to, but in reverse of the steps of loading the transporter 101 onto the truck bed.

Figures 8A, 8B:
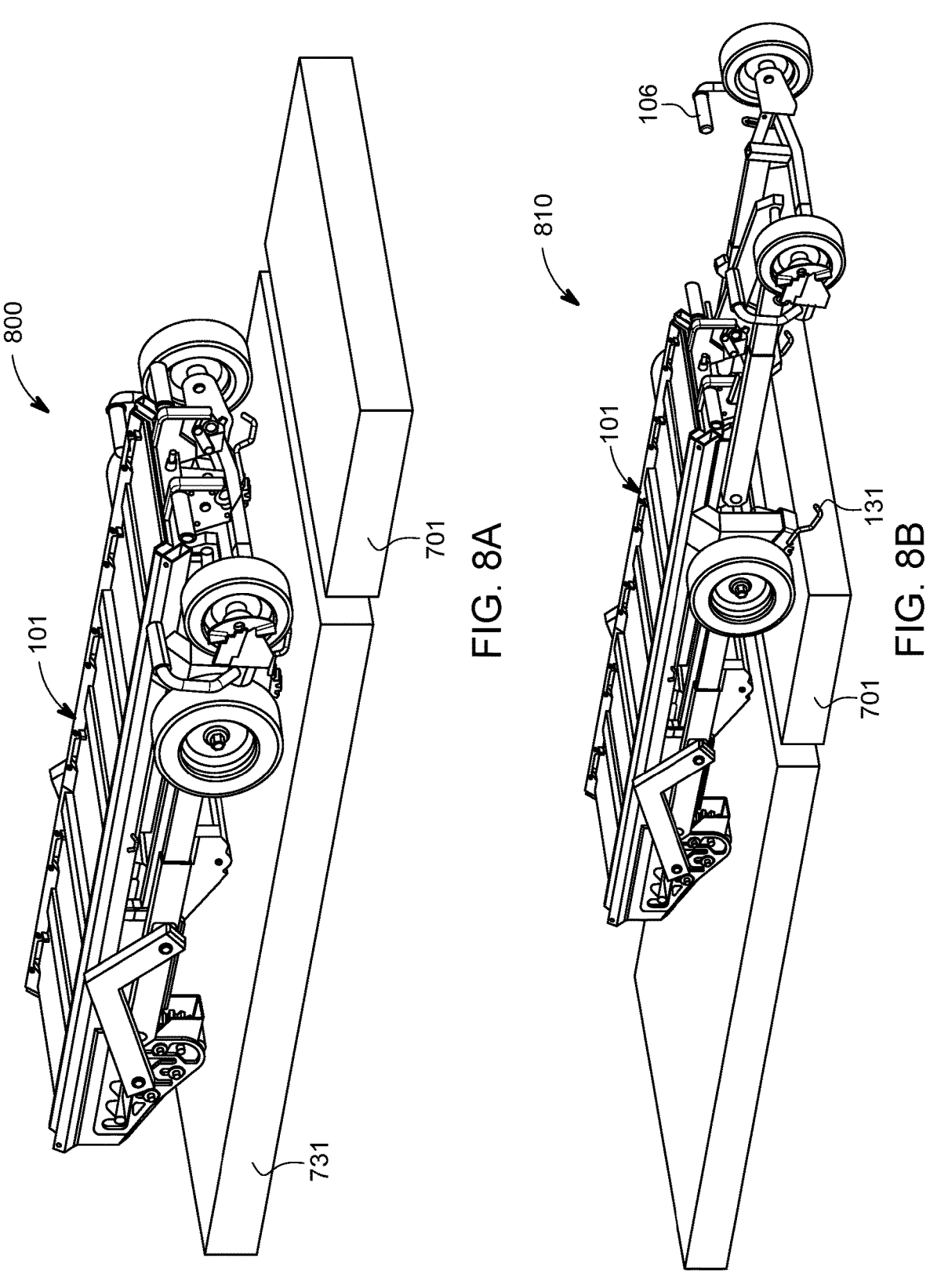
FIG. 8A shows an example first state in unloading the transporter of FIG. 1A from a truck bed.
FIG. 8B shows an example second state in unloading the transporter of FIG. 1A from a truck bed with rear legs extended out.

FIG. 8A shows an example first state in unloading the transporter of FIG. 1A from a truck bed. In various embodiments, the first unloading state shows the transporter 101 in a fully folded and flat configuration on the truck bed.

In various embodiments, this configuration may include a transporter 101 loaded with various cargo, such as storage boxes and power tools. Regardless of its cargo, the transporter 101 is loaded/unloaded onto/from the truck using the same process steps, making it easy for a single operator to move heavy loads single-handedly. At this state, the operator may start pulling the transporter 101 outwards from the truck in preparation of further steps to unload it.

FIG. 8B shows an example second state in unloading the transporter of FIG. 1A from a truck bed with rear legs extended out. In various embodiments, the second unloading state 810 shows the rear legs 102 are pulled out by rear leg handles 106 and are ready to be deployed on the ground.

In various embodiments, the rear edge detectors 131 detect the edge of the truck bed 701 when they enter the locked-state when they come off the edge of the truck bed 701. At this point, the truck bed wheels 113*a* and 113*b* are locked to prevent rapid or sudden unloading of the transporter 101, possibly while carrying heavy cargo, before the rear legs are deployed and locked in place. At this point, the outwards movement of the transporter 101 is paused to allow the operator to deploy the rear legs 102 and lock them.

Figure 8C:
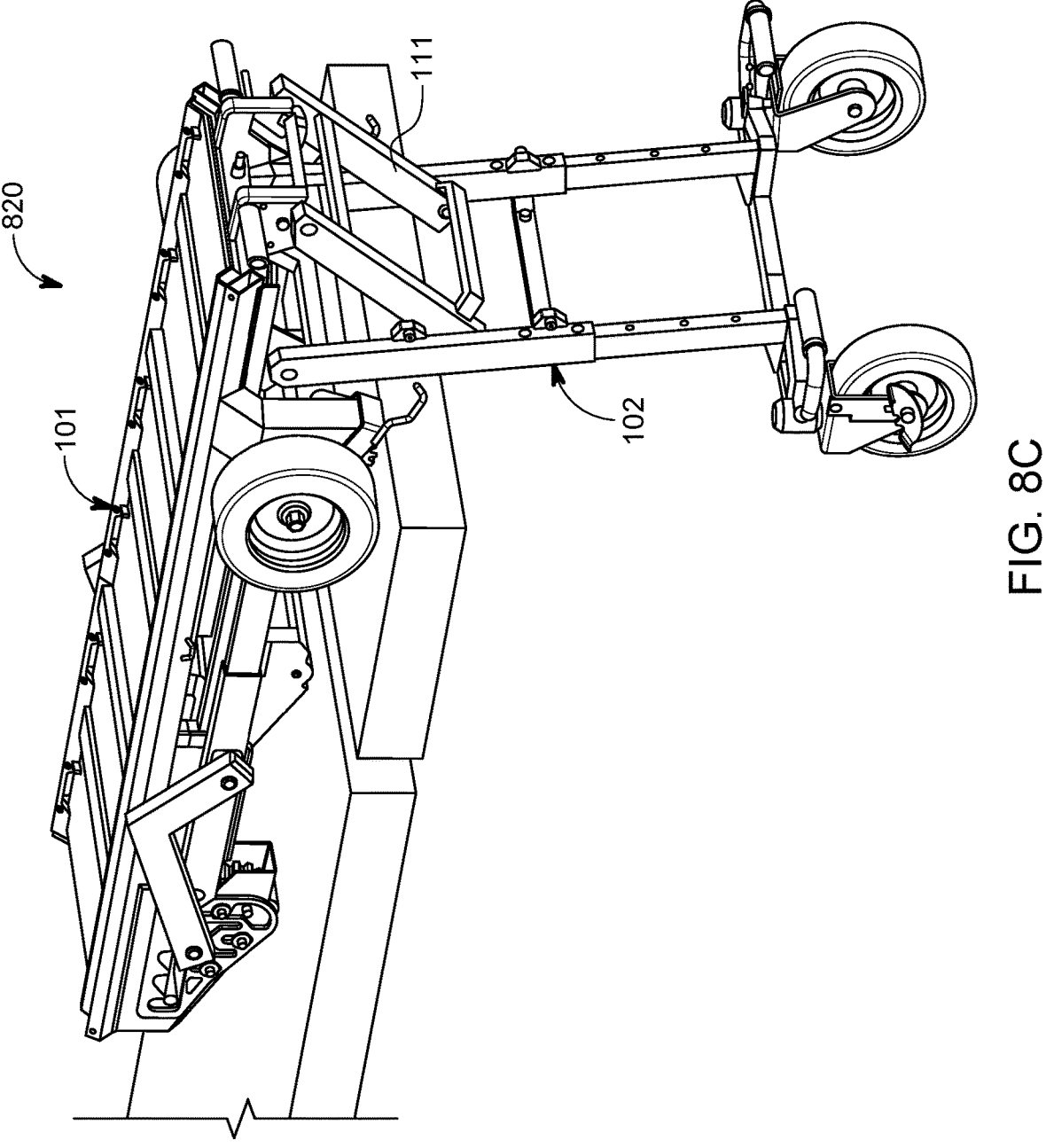
FIG. 8C shows an example third state in unloading the transporter of FIG. 1A from a truck bed with the rear legs folded down at the edge of the truck bed.

FIG. 8C shows an example third state in unloading the transporter of FIG. 1A from a truck bed with the rear legs folded down at the edge of the truck bed. In various embodiments, the third unloading state 820 shows the rear legs 102 deployed on the ground and locked.

In various embodiments, the user/operator pulls the rear legs 102 out from under the transporter 101 and extends them downwards and rests them on the ground. At this point, the spring-loaded rear carriage lock 433 locks and couples the rear leg carriage 133 to rear carriage nut 434, preventing the slippage of rear wheels 102 with respect to the dual-threaded lead screw 121 and the side beams 108*b*. The operator has to take a further action to rigidly lock the rear legs 102 against rotation by hooking up and coupling the rear legs struts 111 with the rear struts hook 123. At this point, the rear legs 102 are fully and rigidly locked in place and are ready to bear the full rear-end weight of the transporter 101 and any cargo it may be carrying.

Figure 8D:
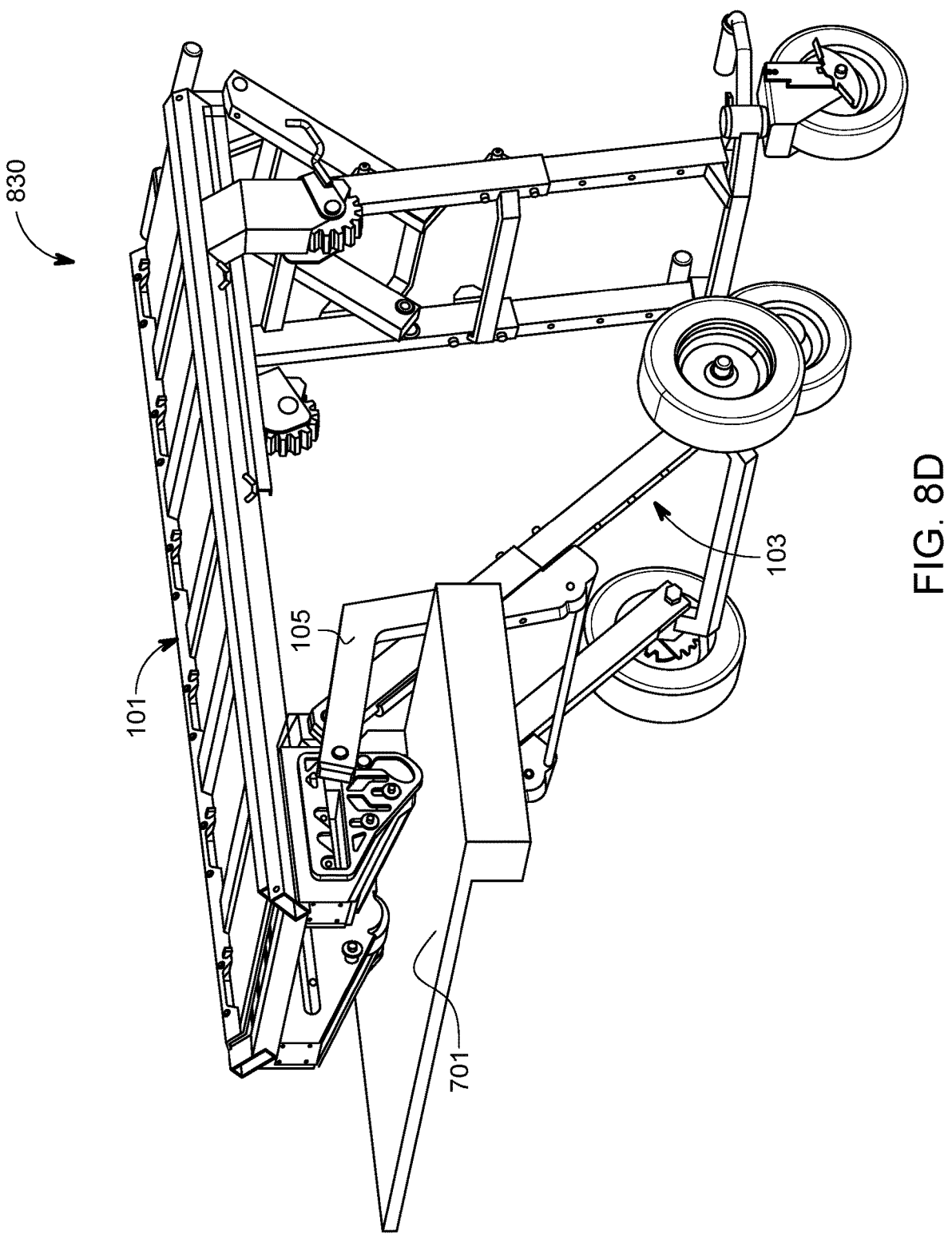
FIG. 8D shows an example fourth state in unloading the transporter of FIG. 1A from a truck bed with the front legs folded down from the truck bed.

FIG. 8D shows an example fourth state in unloading the transporter of FIG. 1A from a truck bed with the front legs folded down from the truck bed. In various embodiments, the fourth unloading state 830 shows the front legs being unfolded while the loading ramps 112*a* and 112*b* are still carrying the front-end load. As the transporter 101 is being pulled out from the truck bed 701 and the front-end load is being transferred from the loading ramps 112*a* and 112*b* to the front legs 103, the front legs 103 are simultaneously unfolding into fully upright position to bear the weight. Simultaneously, the front legs struts cross bar 114 is moving from the rear-most tooth of the front struts rachet teeth 125, to the forward-most tooth corresponding to the fully unfolded and upright position of the front legs 103. If while moving from the rear-most tooth to the forward-most tooth, the loading ramps 112*a* and 112*b* accidentally slip off the edge of the truck bed 701, the next one of the intermediate teeth (between the rear-most and forward-most teeth) will act as a safety brake, engage and lock the front legs struts cross bar 114, resulting in the locking of the front legs 103 in an intermediate unfolding position (between fully folded and fully unfolded), and preventing complete collapse of the front-end of the transporter to the ground. This safety feature can prevent damage to the transporter and/or its cargo and also prevent potential personal injury due to the falling of heavy objects.

It will be understood that unless explicitly stated or specified, the steps described in a process are not ordered and may not necessarily be performed or occur in the order described or depicted. For example, a step A in a process described prior to a step B in the same process, may actually be performed after step B. In other words, a collection of steps in a process for achieving an end-result may occur in any order unless otherwise stated.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." It is further understood that any phrase of the form "A/B" shall mean any one of "A", "B", "A or B", or "A and B". This construct includes the phrase "and/or" itself.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A single-operator transporter, comprising:
a transporter bed with adjustable height to carry cargo;
lockable front legs to carry a front-end weight of the cargo; and
lockable rear legs to carry a rear-end weight of the cargo; wherein
a push on a rear end of the transporter by a single operator, without directly actuating a release component for the front legs, unlocks the front legs to rotate backwards with respect to the transporter bed lifting the front legs off from ground, and allows the transporter to be loaded onto a raised platform wherein a height of the transporter bed is adjusted to a height of the raised platform.

2. The single-operator transporter of claim 1, further comprising an articulating rear leg.

3. The single-operator transporter of claim 1, further comprising a front leg strut locked by an automatic edge detector.

4. The single-operator transporter of claim 1, further comprising a dual-threaded lead screw to raise and lower the transporter bed.

5. The single-operator transporter of claim 1, wherein the transporter bed comprises a plurality of cross beams coupled with a pair of parallel side beams.

6. The single-operator transporter of claim 1, further comprising an automatic edge detector coupled with a loading ramp used to load the transporter onto the raised platform.

7. The single-operator transporter of claim 6, wherein the automatic edge detector comprises a plate constrained to move vertically.

8. The single-operator transporter of claim 6, wherein the loading ramp takes on the front-end weight of the cargo during loading of the transporter onto the raised platform.

9. A load-sustaining transporter comprising:

an articulating front leg to sustain a weight of the load-sustaining transporter before and during loading the load-sustaining transporter onto a raised platform; and a load transfer coupling coupled with the articulating front leg to take on the load from the articulating front leg during loading the load-sustaining transporter, wherein a push on a rear end of the load-sustaining transporter by a single operator, without directly actuating a release component for the articulating front legs, unlocks the articulating front legs to rotate backwards with respect to the load-sustaining transporter, lifting the articulating front legs off from ground, to load the load-sustaining transporter onto the raised platform.

10. The load-sustaining transporter of claim 9, further comprising an articulating rear leg.

11. The load-sustaining transporter of claim 9, further comprising an automatic edge detector.

12. The load-sustaining transporter of claim 9, wherein the load transfer coupling comprises a loading ramp that is coupled with a front leg strut to lock the articulating front leg.

13. The load-sustaining transporter of claim 12, wherein the loading ramp is coupled with the automatic edge detection.

14. The load-sustaining transporter of claim 11, wherein the automatic edge detector includes a slot with ratchet teeth that function as a lock for the articulating front leg and as safety brakes during loading.

15. A transporter comprising:

a load-bearing transporter bed having at least one compartment;

wherein the compartment includes a plurality of latch receivers; and wherein the plurality of latch receivers is configured to receive corresponding latches integrated with storage boxes to be placed on the load-bearing transporter bed, and wherein the at least one compartment has slanted sides to match a shape of bottoms of the storage boxes.

16. The transporter of claim 15, further comprising an articulating front leg and an articulating rear leg supporting the transporter bed.

17. The transporter of claim 15, further comprising a front loading ramp to load the transporter onto a truck.

18. The transporter of claim 15, wherein the at least one compartment is formed by side beams and cross beams.

19. The transporter of claim 15, wherein the storage boxes are automatically centered when placed on the at least one compartment.

20. The transporter of claim 15, wherein the latches integrated with the storage boxes are deployed automatically into the plurality of latch receivers to lock down the storage boxes on the transporter bed.

\* \* \* \* \*